United States Patent
Mori et al.

(10) Patent No.: US 11,984,626 B2
(45) Date of Patent: May 14, 2024

(54) CONTROL APPARATUS, ELECTRIC POWER SUPPLY APPARATUS, WORKING MACHINE, MANAGEMENT APPARATUS, CONTROL METHOD, MANAGEMENT METHOD, AND COMPUTER-READABLE RECORDING MEDIUM

(71) Applicant: HONDA MOTOR CO.,LTD., Tokyo (JP)

(72) Inventors: Takamasa Mori, Tokyo (JP); Nobutaka Nakajima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 331 days.

(21) Appl. No.: 17/342,551

(22) Filed: Jun. 9, 2021

(65) Prior Publication Data
US 2021/0296670 A1    Sep. 23, 2021

Related U.S. Application Data

(63) Continuation of application No. PCT/JP2018/045963, filed on Dec. 13, 2018.

(51) Int. Cl.
*H01M 8/04955* (2016.01)
*B60L 3/04* (2006.01)
(Continued)

(52) U.S. Cl.
CPC .......... *H01M 8/04955* (2013.01); *B60L 3/04* (2013.01); *B60L 15/40* (2013.01); *B60L 50/70* (2019.02);
(Continued)

(58) Field of Classification Search
CPC ......... H01M 8/04955; H01M 8/04858; H01M 2250/20; H01M 8/043; H01M 8/04302;
(Continued)

(56) References Cited

U.S. PATENT DOCUMENTS 8,468,464 B2 * 6/2013 Abramson ............ G06F 3/0481
715/781
9,195,290 B2 * 11/2015 Siliski ................ G01C 21/3608
(Continued)

FOREIGN PATENT DOCUMENTS

JP    2001222336 A    8/2001
JP    2003303016 A   10/2003
(Continued)

OTHER PUBLICATIONS

Office Action issued for counterpart Japanese Application No. 2020-559653, issued by the Japan Patent Office dated Jan. 11, 2022 (dated Dec. 28, 2021).
(Continued)

*Primary Examiner* — Jonathan M Dager
*Assistant Examiner* — Jean W Charleston

(57) ABSTRACT

A control apparatus controls an electric power supply apparatus configured to supply electric power to a working machine. The electric power supply apparatus is provided with a fuel cell. The control apparatus is provided with a restriction request acquisition unit configured to acquire a restriction request for requesting restriction of the supply of the electric power via a communication network, and a restriction unit configured to restrict the supply of the electric power in a case where the restriction request acquisition unit acquires the restriction request. The control apparatus may be provided with an end detection unit configured to detect end of use of the working machine. The restriction unit may decide to start the restriction in a case where, after the restriction request acquisition unit acquires the restriction request, the end detection unit detects the end of the use of the working machine.

18 Claims, 7 Drawing Sheets

(51) Int. Cl.
  *B60L 15/40* (2006.01)
  *B60L 50/70* (2019.01)
  *B60L 58/30* (2019.01)
  *B60R 25/045* (2013.01)
  *H01M 8/04858* (2016.01)
  *G06Q 20/14* (2012.01)

(52) U.S. Cl.
  CPC ............ *B60L 58/30* (2019.02); *B60R 25/045* (2013.01); *H01M 8/04858* (2013.01); *G06Q 20/14* (2013.01); *H01M 2250/20* (2013.01)

(58) Field of Classification Search
  CPC ......... H01M 8/04303; H01M 8/04798; H01M 8/04932; B60L 3/04; B60L 15/40; B60L 50/70; B60L 58/30; B60L 3/0023; B60L 2200/40; B60L 53/665; B60L 53/68; B60L 2270/36; B60R 25/045; G06Q 20/14; G06Q 20/145; G06Q 20/308; G06Q 20/4015; G06Q 20/4037; Y02T 90/12; Y02T 90/16; Y02T 90/167; Y02T 90/40; Y02T 10/70; Y02T 10/7072; Y02T 90/14; Y04S 30/14; G07F 15/005; Y02E 60/50
  USPC ............................................................ 701/2
  See application file for complete search history.

(56) References Cited

U.S. PATENT DOCUMENTS

| | | | | |
|---|---|---|---|---|
| 10,840,527 | B2* | 11/2020 | Tanaka | .............. H01M 8/04544 |
| 2006/0238383 | A1* | 10/2006 | Kimchi | ................ G09B 29/106 |
| | | | | 340/995.1 |
| 2009/0210388 | A1* | 8/2009 | Elson | ...................... G06F 16/29 |
| 2011/0191023 | A1* | 8/2011 | Engstrom | .............. G01C 21/20 |
| | | | | 701/532 |
| 2013/0159330 | A1* | 6/2013 | Smith | .................... G06Q 50/01 |
| | | | | 707/758 |
| 2014/0330673 | A1 | 11/2014 | Winand | |
| 2015/0340884 | A1* | 11/2015 | Suzuki | ...................... B60L 7/12 |
| | | | | 320/137 |
| 2016/0240872 | A1* | 8/2016 | Hoshi | ............... H01M 8/04529 |
| 2017/0236331 | A1* | 8/2017 | Bryson | ................. G06T 19/006 |
| | | | | 345/633 |
| 2019/0190047 | A1 | 6/2019 | Kitaji | |
| 2019/0199131 | A1 | 6/2019 | Nakamura | |
| 2020/0168929 | A1* | 5/2020 | Tanaka | .............. H01M 8/04611 |
| 2020/0220184 | A1* | 7/2020 | Shimada | ................. B60L 50/75 |
| 2020/0391615 | A1* | 12/2020 | Beck | ................... H01M 16/006 |

FOREIGN PATENT DOCUMENTS

| | | | | |
|---|---|---|---|---|
| JP | 2014085758 A | | 5/2014 | |
| JP | 2015511368 A | | 4/2015 | |
| WO | 2010005052 A2 | | 1/2010 | |
| WO | 2018043639 A1 | | 3/2018 | |
| WO | 2018043662 A1 | | 3/2018 | |
| WO | WO-2018043639 A1 * | 3/2018 | ............... F24H 1/00 |

OTHER PUBLICATIONS

International Preliminary Report on Patentability for International Application No. PCT/JP2018/045963, issued by the International Bureau of WIPO dated Jun. 8, 2021.

* cited by examiner

600

| VEHICLE ID | TIME | VEHICLE LOCATION | SITUATION OF VEHICLE | SITUATION OF ELECTRIC POWER SOURCE | PAYMENT STATUS OF FEE | RESTRICTION STATUS OF USAGE |
|---|---|---|---|---|---|---|
| 622 | 624 | 626 | 628 | 630 | 632 | 634 |
| V_001 | : | (, , **) | CURRENTLY USED | CURRENTLY GENERATING ELECTRIC POWER | PAID | NO RESTRICTION |
| : | : | : | : | : | : | : |
| V_002 | : | (, , **) | CURRENTLY STOPPED | CURRENTLY STOPPED | IN ARREARS | CURRENTLY RESTRICTED |
| : | : | : | : | : | : | : |

FIG. 6

CONTROL APPARATUS, ELECTRIC POWER SUPPLY APPARATUS, WORKING MACHINE, MANAGEMENT APPARATUS, CONTROL METHOD, MANAGEMENT METHOD, AND COMPUTER-READABLE RECORDING MEDIUM

The contents of the following international application are incorporated herein by reference:
PCT/JP2018/045963 filed in WO on Dec. 13, 2018.

BACKGROUND

1. Technical Field

The present invention relates to a control apparatus, an electric power supply apparatus, a working machine, a management apparatus, a control method, a management method, and a computer-readable recording medium.

2. Related Art

Patent document 1 discloses that in rental business of storage cells for electric vehicles, it is checked whether an owner of an electric vehicle is registered in a database at the time of replacement of a storage cell, and such a control is performed that the storage cell is not actuated in a case where the owner of the electric vehicle is not registered in the database. Patent document 2 discloses a fuel cell electrically-operated device in which under a condition that a fuel cartridge is authenticated via a communication network, a fuel from the fuel cartridge is usable. Patent documents 3 to 5 disclose that in rental business of peripheral equipment of computers or the like, all or a part of functions of the peripheral equipment or the like is stopped via a network in a case where a fee according to a use amount of the peripheral equipment or the like is not paid, and subsequently, the stop is cancelled.

CITATION LIST

Patent Documents

Patent document 1: PCT International Publication No. WO2010-005052
Patent document 2: Japanese Translation of PCT International Publication No. 2015-511368
Patent document 3: Japanese Unexamined Patent Application, Publication No. 2001-222336
Patent document 4: Japanese Unexamined Patent Application, Publication No. 2003-303016
Patent document 5: Japanese Unexamined Patent Application, Publication No. 2014-085758

According to the technologies described in Patent documents 1 and 2, a function of equipment can be stopped only at timing at which the storage cell or the like is replaced, and it is not possible for an owner of the storage cell or the like to promptly collect a fee. According to the technologies described in Patent documents 3 to 5, even in a case where a user uses the peripheral equipment or the like, the function of the peripheral equipment or the like is forcedly stopped.

GENERAL DISCLOSURE

According to a first aspect of the present invention, a control apparatus is provided. The above-mentioned control apparatus controls an electric power supply apparatus configured to supply electric power to a working machine, for example. The above-mentioned electric power supply apparatus is provided with a fuel cell, for example. The above-mentioned control apparatus is provided with a restriction request acquisition unit configured to acquire a restriction request for requesting restriction of the supply of the electric power from the electric power supply apparatus to the working machine via a communication network, for example. The above-mentioned control apparatus is provided with a restriction unit configured to restrict the supply of the electric power from the electric power supply apparatus to the working machine in a case where the restriction request acquisition unit acquires the restriction request, for example.

The above-mentioned electric power supply apparatus may be provided with an end detection unit configured to detect end of use of the working machine. In the above-mentioned electric power supply apparatus, the restriction unit may decide to start the restriction in a case where, after the restriction request acquisition unit acquires the restriction request, the end detection unit detects the end of the use of the working machine. The above-mentioned electric power supply apparatus may be provided with a start detection unit configured to detect start of use of the working machine. In the above-mentioned electric power supply apparatus, the restriction unit may decide the start of the restriction in a case where, after the restriction request acquisition unit acquires the restriction request and the end detection unit detects the end of the use of the working machine, the start detection unit detects the start of the use of the working machine.

In the above-mentioned electric power supply apparatus, the restriction unit may restrict the supply of the electric power by at least one of (i) a unit configured to stop at least one of supply and reception of the electric power, (ii) a unit configured to set a supply amount of the electric power to be lower than a predetermined value, (iii) a unit configured to prohibit activation of the fuel cell, (iv) a unit configured to prohibit electric power generation of the fuel cell, (v) a unit configured to set output electric power of the fuel cell to be lower than a predetermined value, (vi) a unit configured to set an output rate of the fuel cell to be lower than a predetermined threshold, (vii) a unit configured to prohibit replenishment of a fuel of the fuel cell, (viii) a unit configured to prohibit detachment of the fuel cell or detachment of a fuel cartridge of the fuel cell, and (ix) a unit configured to set a replenishable amount of the fuel of the fuel cell to be lower than a predetermined value. The above-mentioned electric power supply apparatus may be provided with a removal request acquisition unit configured to acquire a removal request for requesting removal of the restriction via the communication network. In the above-mentioned electric power supply apparatus, the restriction unit may decide the removal of the restriction in a case where the removal request acquisition unit acquires the removal request.

According to a second aspect of the present invention, an electric power supply apparatus is provided. The above-mentioned electric power supply apparatus is provided with the above-mentioned control apparatus, for example. The above-mentioned electric power supply apparatus is provided with a fuel cell, for example.

According to a third aspect of the present invention, a working machine is provided. The above-mentioned working machine is provided with the above-mentioned electric power supply apparatus, for example. The above-mentioned working machine is provided with an electric motor configured to convert electrical energy supplied from the above-mentioned electric power supply apparatus into mechanical energy, for example.

According to a fourth aspect of the present invention, a management apparatus is provided. The above-mentioned management apparatus manages an electric power supply apparatus configured to supply electric power to a working machine, for example. The above-mentioned electric power supply apparatus is provided with a fuel cell, for example. The above-mentioned management apparatus is provided with an event detection unit configured to detect an occurrence of a predetermined first event related to at least one of the working machine and the electric power supply apparatus, for example. The above-mentioned management apparatus is provided with a restriction request transmission unit configured to transmit, in a case where the event detection unit detects the occurrence of the first event, a restriction request for requesting restriction of the supply of the electric power from the electric power supply apparatus to the working machine to at least one of the working machine and the electric power supply apparatus via a communication network, for example.

The above-mentioned management apparatus may be provided with a location information acquisition unit configured to acquire location information indicating a location of at least one of the working machine and the electric power supply apparatus. The above-mentioned management apparatus may be provided with a location determination unit configured to refer to an area information storage unit configured to store area information indicating a location of an area where execution of the restriction is allowed, and determine whether a geographic relationship between (i) the location of at least one of the working machine and the electric power supply apparatus which is indicated by the location information and (ii) the location of the area indicated by the area information satisfies a predetermined first geographic condition. In the above-mentioned management apparatus, the restriction request transmission unit may transmit the restriction request to at least one of the working machine and the electric power supply apparatus in a case where the geographic relationship satisfies the predetermined first geographic condition.

In the above-mentioned management apparatus, the restriction request may include information indicating locations of an area where execution of the restriction is allowed and an area where the execution of the restriction is prohibited. The above-mentioned management apparatus may be provided with a location information acquisition unit configured to acquire location information indicating a location of at least one of the working machine and the electric power supply apparatus. The above-mentioned management apparatus may be provided with an area extraction unit configured to refer to an area information storage unit configured to store area information indicating locations of an area where execution of the restriction is allowed and an area where the execution of the restriction is prohibited, and extract an area where a geographic relationship between the area and the location of at least one of the working machine and the electric power supply apparatus satisfies a predetermined second geographic condition out of the area where the execution of the restriction is allowed and the area where the execution of the restriction is prohibited. In the above-mentioned management apparatus, the restriction request transmission unit may transmit information of a location of the area extracted by the area extraction unit, together with the restriction request or in association with the restriction request, to at least one of the working machine and the electric power supply apparatus.

In the above-mentioned management apparatus, the event detection unit may detect at least one of an elimination of the first event and an occurrence of the second event that may eliminate the first event. The above-mentioned management apparatus may be provided with a removal request transmission unit configured to transmit, in a case where the event detection unit detects at least one of the elimination of the first event and the occurrence of the second event, a removal request for requesting removal of the restriction to at least one of the working machine and the electric power supply apparatus via a communication network. In the above-mentioned management apparatus, the first event may include at least one of a failure, a theft, a loss, and an arrear of a usage fee of at least one of the working machine and the electric power supply apparatus.

According to a fifth aspect of the present invention, a management system is provided. The above-mentioned management system is provided with the above-mentioned control apparatus, for example. The above-mentioned management system is provided with the above-mentioned management apparatus, for example.

According to a sixth aspect of the present invention, a control method is provided. The above-mentioned control method is a method of controlling an electric power supply apparatus configured to supply electric power to a working machine, for example. The above-mentioned electric power supply apparatus is provided with a fuel cell, for example. The above-mentioned control method includes acquiring a restriction request for requesting restriction of the supply of the electric power from the electric power supply apparatus to the working machine via a communication network, for example. The above-mentioned control method includes restricting the supply of the electric power from the electric power supply apparatus to the working machine in a case where the restriction request is acquired in the acquiring, for example.

According to a seventh aspect of the present invention, a management method is provided. The above-mentioned management method is a management method of managing an electric power supply apparatus configured to supply electric power to a working machine, for example. The above-mentioned electric power supply apparatus is provided with a fuel cell, for example. The above-mentioned management method includes detecting an occurrence of a predetermined first event related to at least one of the working machine and the electric power supply apparatus, for example. The above-mentioned management method includes transmitting, in a case where the occurrence of the first event is detected in the detecting, a restriction request for requesting restriction of the supply of the electric power from the electric power supply apparatus to the working machine to at least one of the working machine and the electric power supply apparatus via a communication network, for example.

According to an eighth aspect of the present invention, a program is provided. A non-transitory computer-readable medium that stores the above-mentioned program may be provided. The above-mentioned program may be a program for causing a computer to function as the above-mentioned control apparatus. The above-mentioned program may be a program for causing the computer to execute the above-mentioned control method.

According to a ninth aspect of the present invention, a program is provided. A non-transitory computer-readable medium that stores the above-mentioned program may be provided. The above-mentioned program may be a program for causing a computer to function as the above-mentioned management apparatus. The above-mentioned program may be a program for causing the computer to execute the above-mentioned management method.

The summary clause does not necessarily describe all necessary features of the embodiments of the present invention. The present invention may also be a sub-combination of the features described above.

BRIEF DESCRIPTION OF THE DRAWINGS

FIG. 6 schematically illustrates one example of a data table 600.

DESCRIPTION OF EXEMPLARY EMBODIMENTS

Figure 1:
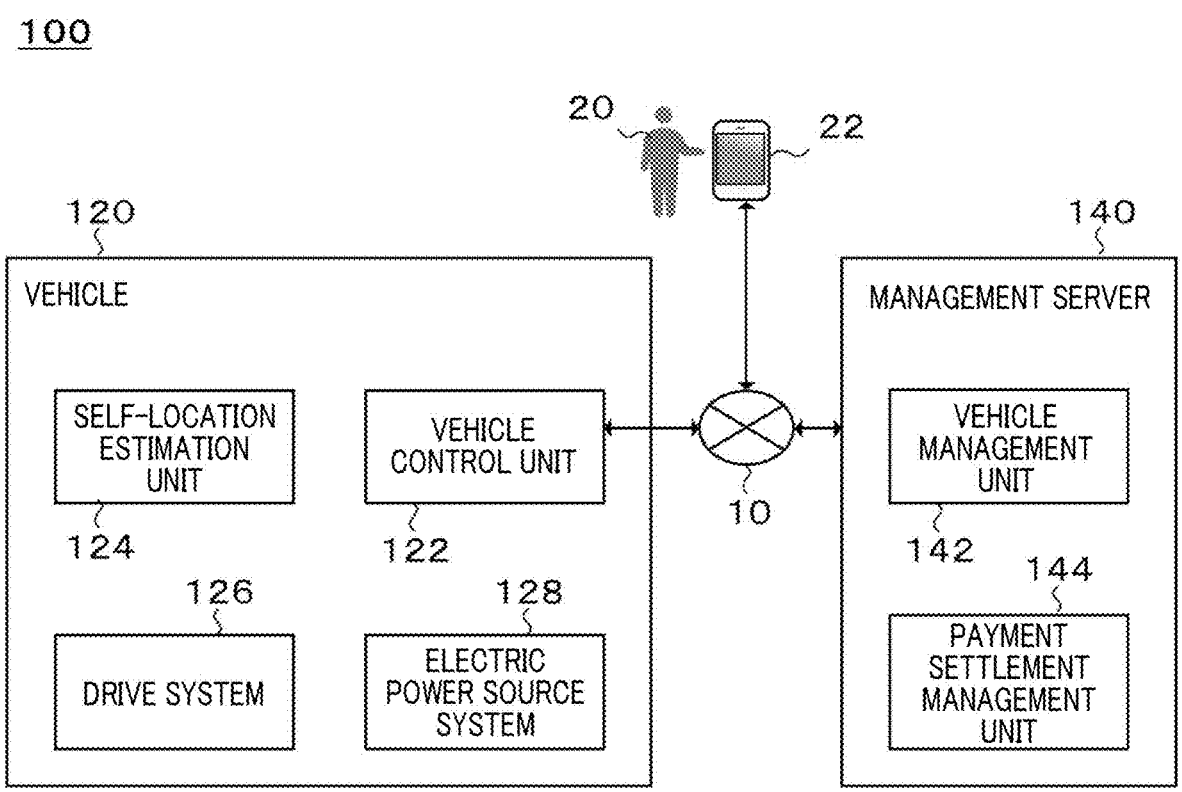
FIG. 1 schematically illustrates one example of a system configuration of a vehicle management system 100.

Hereinafter, the present invention will be described by way of embodiments of the invention, but the following embodiments are not intended to limit the invention according to the claims. In addition, not all combinations of features described in the embodiments necessarily have to be essential to solving means of the invention. Note that in the drawings, identical or similar components may be assigned with identical reference signs, and duplicated description may be omitted.

[Outline of Vehicle Management System 100]

FIG. 1 schematically illustrates one example of a system configuration of a vehicle management system 100. According to the present embodiment, the vehicle management system 100 is provided with a vehicle 120, for example. The vehicle management system 100 is provided with a management server 140, for example.

According to the present embodiment, the vehicle 120 has a vehicle control unit 122, a self-location estimation unit 124, a drive system 126, and an electric power source system 128, for example. Each unit of the vehicle 120 is configured to mutually transmit and receive information, for example. According to the present embodiment, the management server 140 is provided with a vehicle management unit 142 and a payment settlement management unit 144, for example. Each unit of the management server 140 is configured to mutually transmit and receive information, for example.

The vehicle 120 and the management server 140 are configured to mutually transmit and receive the information via a communication network 10, for example. At least one of the vehicle 120 and the management server 140 may be configured to transmit and receive the information with a communication terminal 22 used by a user 20 of the vehicle 120. The user 20 may be an owner who owns the vehicle 120, or may be a user who uses the vehicle 120.

According to the present embodiment, the communication network 10 may be a transmission path of a wired communication, may be a transmission path of a wireless communication, or may be a combination of the transmission path of the wireless communication and the transmission path of the wired communication. The communication network 10 may include a wireless packet communication network, the Internet, a P2P network, a dedicated line, a VPN, an electric power line communication line, or the like. The communication network 10 may include (i) a mobile communication network such as a mobile phone line network, or may include (ii) a wireless data communication network such as a wireless MAN (for example, WiMAX (registered trademark), a wireless LAN (for example, WiFi (registered trademark), Bluetooth (registered trademark), Zigbee (registered trademark), or near field communication (NFC). The communication network 10 may include a network for V2X such as a vehicle-to-vehicle communication (which may be referred to as V2V), a vehicle-to-infrastructure communication (which may be referred to as V2I), or a vehicle-to-pedestrian communication (which may be referred to as V2P).

According to the present embodiment, the communication terminal 22 may be an information processing apparatus used by the user 20, and a detail of the communication terminal is not specifically limited. Examples of the communication terminal 22 include a personal computer, a mobile terminal, and the like. Examples of the mobile terminal include a mobile phone, a smartphone, a PDA, a tablet, a notebook computer or a laptop computer, a wearable computer, and the like.

According to the present embodiment, the vehicle management system 100 manages one or more of the vehicles 120. For example, the vehicle management system 100 manages a use status of each of one or more of the vehicles 120. A user of the vehicle 120 pays a usage fee of the vehicle 120 when using the vehicle 120, for example. A payment method for the usage fee may be a method of making a payment in advance, or may be a method of making a payment later. In this case, the vehicle management system 100 may manage a payment status of the usage fee related to each of one or more of the vehicles 120.

The vehicle management system 100 may manage a use status of each of one or more of the electric power source systems 128. The user of the vehicle 120 pays a usage fee of the electric power source system 128 mounted to the vehicle 120 when using the vehicle 120, for example. A payment method for the usage fee may be a method of making a payment in advance, or may be a method of making a payment later. In this case, the vehicle management system 100 may manage a payment status of the usage fee related to each of one or more of the electric power source systems 128.

According to the present embodiment, the vehicle management system 100 restricts the use of the vehicle 120 or the electric power source system 128 by the user 20 in a case where an abnormality has occurred in the vehicle 120 or the electric power source system 128 corresponding to a management target or a delay of the payment of the usage fee has occurred. According to the present embodiment, the use of the vehicle 120 or the electric power source system 128 may be restricted at appropriate timing at which convenience, safety, or the like of the user 20 is taken into account. According to the present embodiment, the use of the vehicle 120 or the electric power source system 128 may be restricted at appropriate timing before a storage cell or a fuel cartridge for a fuel cell is replaced.

In a case where the above-mentioned abnormality is eliminated, the vehicle management system 100 removes the above-mentioned restriction. In a case where the payment of the above-mentioned usage fee is completed, a collateral for the payment is provided, or the payment is guaranteed, the vehicle management system 100 removes the above-mentioned restriction.

According to the present embodiment, the vehicle 120 performs working for transporting at least one of a person and goods (which may be referred to as transportation work). The vehicle 120 may perform the transportation work by an operation by a driver, or may perform the transportation work by an automated operation. Note that the work performed by the vehicle 120 is not limited to the transportation work. The vehicle 120 may perform any work, instead of the transportation work or together with the transportation work, by using electric power.

Examples of the vehicle 120 include a motor vehicle, a motorcycle, a train, and the like. Examples of the motorcycle include (i) a motorbike, (ii) a three-wheeler, and (iii) a standing ride type bicycle, tricycle, or the like having a motive power unit such as Segway (registered trademark), Kickboard (registered trademark) with a motive power unit, or a skateboard with a motive power unit.

According to the present embodiment, the vehicle control unit 122 controls each unit of the vehicle 120. For example, the vehicle control unit 122 controls an operation of the drive system 126. The vehicle control unit 122 may control an operation of the electric power source system 128. According to one embodiment, the vehicle control unit 122 receives a signal for restricting the use of the vehicle 120 or the electric power source system 128 (which may be referred to as a restriction signal) from the vehicle management unit 142 of the management server 140. In this case, the vehicle control unit 122 transmits the restriction signal, for example, to the electric power source system 128. According to another embodiment, the vehicle control unit 122 receives a signal for removing the restriction related to the use of the vehicle 120 or the electric power source system 128 (which may be referred to as a removal signal) from the vehicle management unit 142. In this case, the vehicle control unit 122 transmits the removal signal, for example, to the electric power source system 128. A detail of the vehicle control unit 122 will be described below.

According to the present embodiment, the self-location estimation unit 124 estimates a location of the vehicle management system 100. The self-location estimation unit 124 may include at least one of (i) a positioning system configured to estimate a current location using a GPS signal, (ii) a system configured to estimate the current location using a radio wave intensity of a radio signal, and (iii) a system configured to estimate the current location by calculating a displacement from a reference point using an output from an internal sensor such as an acceleration sensor, a gyro sensor, a geomagnetic sensor, or a rotary encoder.

According to the present embodiment, the drive system 126 moves the vehicle 120 using electric power supplied from the electric power source system 128. The drive system 126 may have an electric motor (not illustrated) configured to convert electrical energy supplied from the electric power source system 128 into mechanical energy. The drive system 126 may move the vehicle 120 using motive power generated by the electric motor. When the supply of the electric power from the electric power source system 128 is stopped, it is not possible for the drive system 126 to move the vehicle 120. When the electric power supplied from the electric power source system 128 is decreased, it is not possible for the drive system 126 to move the vehicle 120 at a high speed.

According to the present embodiment, the electric power source system 128 supplies the electric power to each unit of the vehicle 120. The electric power source system 128 may include a fuel cell. According to one embodiment, the electric power source system 128 acquires the restriction signal from the vehicle control unit 122. In this case, after the restriction signal is acquired, for example, the electric power source system 128 restricts the supply of the electric power from the electric power source system 128 to the drive system 126 at earliest possible timing corresponding to timing at which the convenience, the safety, or the like of the user 20 is taken into account. According to another embodiment, the electric power source system 128 acquires the removal signal from the vehicle control unit 122. In this case, for example, the restriction related to the supply of the electric power from the electric power source system 128 to the drive system 126 is removed. A detail of the electric power source system 128 will be described below.

According to the present embodiment, the management server 140 manages one or more of the vehicles 120. According to the present embodiment, the vehicle management unit 142 manages a use status of each of one or more of the vehicles 120. The vehicle management unit 142 may detect that an abnormality has occurred in the vehicle 120. The vehicle management unit 142 may manage a use status of one or more of the electric power source systems 128. The vehicle management unit 142 may detect that an abnormality has occurred in the electric power source system 128. In a case where a predetermined condition is established, the vehicle management unit 142 may restrict the use of the vehicle 120 or the electric power source system 128 or remove the restriction. The vehicle management unit 142 may restrict the use of the vehicle 120 by restricting the use of the electric power source system 128. A detail of the vehicle management unit 142 will be described below.

According to the present embodiment, the payment settlement management unit 144 manages a shift of a use authority with regard to each of one or more of the vehicles 120. For example, a payment status of the usage fee related to each of one or more of the vehicles 120 is managed. The vehicle management system 100 manages a shift of a use authority with regard to each of one or more of the electric power source systems 128. For example, a payment status of the usage fee of each of one or more of the electric power source systems 128 may be managed.

Examples of the shift of the use authority include a grant, a change, and a termination of the use authority. For example, in a case where the usage fee of the vehicle 120 is paid, a collateral related to the payment of the usage fee is provided, or the payment of the usage fee is guaranteed, the use authority of the vehicle 120 is granted. For example, in a case where contractual contents related to the use of the vehicle 120 are changed, the use authority of the vehicle 120 is changed. For example, in a case where a valid period of the use authority of the vehicle 120 expires, or a payment due date of the usage fee of the vehicle 120 expires, the use authority of the vehicle 120 is terminated.

According to one embodiment, the payment settlement management unit 144 monitors the payment status of the usage fee with regard to each of one or more of the vehicles 120, and detects that the use authority related to the particular vehicle 120 is terminated. For example, the payment settlement management unit 144 detects that a payment delay (which may be referred to as an overdue, a default, or the like) occurs. The payment settlement management unit 144 may output information indicating the termination of the use authority related to the particular vehicle 120 to the vehicle management unit 142.

According to another embodiment, the payment settlement management unit 144 monitors the payment status of the usage fee with regard to each of one or more of the vehicles 120, and detects that the use authority related to the particular vehicle 120 has been granted. For example, the payment settlement management unit 144 detects a payment of the usage fee, an elimination of the payment delay, or the like. The payment settlement management unit 144 may output information indicating the grant of the use authority related to the particular vehicle 120 to the vehicle management unit 142.

The vehicle management system 100 may be one example of a control apparatus, a management apparatus, and a management system. The vehicle 120 may be one example of a working machine. The drive system 126 may be one example of the working machine. The electric power source system 128 may be one example of an electric power supply apparatus. The management server 140 may be one example of a management apparatus. The vehicle management unit 142 may be one example of the management apparatus. The restriction signal may be one example of a restriction request. The removal signal may be one example of a removal request.

According to the present embodiment, a detail of the vehicle management system 100 will be described while a case where the vehicle management system 100 manages one or more of the vehicles 120 is used as an example. However, the vehicle management system 100 is not limited to the present embodiment. According to another embodiment, the vehicle management system 100 may manage one or more of the electric power source systems 128 mounted to one or more of the vehicles 120. The management of the electric power source system 128 is executed according to a procedure similar to a management procedure of the vehicle 120, for example.

According to the present embodiment, the detail of the working machine has been described while a case where the vehicle 120 corresponding to one example of the working machine performs transport work is used as an example. However, the working machine is not limited to the vehicle 120. Other examples of the working machine include transport equipment, carrier equipment, cleaning equipment, air-conditioning equipment, illumination equipment, a robot, and the like, Examples of the transport equipment include a movable object, heavy equipment, a farm working machine, snow removing equipment, an elevator, an escalator, and the like. Examples of the movable object include a vehicle, a marine vessel, a flight vehicle, and the like. Examples of the marine vessel includes a ship, a hovercraft, a personal watercraft, a submarine, a submersible vessel, an underwater propulsion vehicle, and the like. Examples of the flight vehicle include an airplane, an airship or an air ball, a balloon, a helicopter, a drone, and the like. Examples of the carrier equipment include a pump, a blower, an atomizer, a washer, and the like. Examples of the cleaning equipment include a vacuum cleaner, a washing machine, and the like.

According to the present embodiment, the detail of the vehicle 120 has been described while a case is used as an example where the vehicle control unit 122 transfers the restriction signal and the removal signal to the electric power source system 128, and a controller of the electric power source system 128 decides the execution and the removal of the restriction related to the electric power supply. However, the vehicle 120 is not limited to the present embodiment. According to another embodiment, the vehicle control unit 122 may receive the restriction signal and the removal signal, and decide the execution and the removal of the restriction related to the electric power supply. In this case, the vehicle control unit 122 may be one example of the control apparatus.

[Specific Configuration of Each Unit of Vehicle Management System 100]

Each unit of the vehicle management system 100 may be realized by hardware, may be realized by software, or may be realize by hardware and software. At least a part of each unit of the vehicle management system 100 may be realized by a single server, or may be realized by a plurality of servers. At least a part of each unit of the vehicle management system 100 may be realized on a virtual machine or a cloud system. At least a part of each unit of the vehicle management system 100 may be realized by a personal computer or a mobile terminal. Examples of the mobile terminal include a mobile phone, a smartphone, a PDA, a tablet, a notebook computer or a laptop computer, or a wearable computer. Each unit of the vehicle management system 100 may store information using a distributed ledger technology such as Block Chain or a distributed type network.

In a case where at least a part of components configuring the vehicle management system 100 is realized by software, the components realized by the software may be realized when a program defining an operation related to the components is activated in a generally configured information processing apparatus. For example, the above-mentioned information processing apparatus is provided with (i) a data processing apparatus having a processor such as a CPU or a GPU, a ROM, a RAM, a communication interface, or the like, (ii) an input apparatus such as a keyboard, a touch panel, a camera, a microphone, various types of sensors, or a GPS receiver, (iii) an output apparatus such as a display device, a speaker, or a vibration device, and (iv) a storage device such as a memory or an HDD (including an external storage device).

In the above-mentioned information processing apparatus, the above-mentioned data processing apparatus or storage device may store a program. The above-mentioned program may be stored in a non-transitory computer-readable recording medium. The above-mentioned program, when being executed by the processor, causes the above-mentioned information processing apparatus to execute the operation defined by the program.

A program may be stored in a non-transitory computer-readable recording medium. The program may be stored in a computer-readable medium such as a CD-ROM, a DVD-ROM, a memory, or a hard disk, or may be stored in a storage device connected to a network. The program may be installed into the computer configuring at least a part of the vehicle management system 100 from the computer-readable medium or the storage device connected to the network. When the program is executed, the computer may function as at least a part of each unit of the vehicle management system 100.

The program that causes the computer to function as at least a part of each unit of the vehicle management system 100 may be provided with a module that defines an operation of each unit of the vehicle management system 100. The program or module works with the data processing apparatus, the input apparatus, the output apparatus, the storage device, or the like, and causes the computer to function as each unit of the vehicle management system 100, or causes the computer to execute an information processing method in each unit of the vehicle management system 100.

Information processing described in the program functions as specific means in which software associated with the program and various types of hardware resources of the vehicle management system 100 work in cooperation when the program is read into the computer. Then, the above-mentioned specific means realizes an arithmetic operation or a process of information according to an intended use of the computer according to the present embodiment to constitute the vehicle management system 100 according to the intended use.

The above-mentioned program may be a program for causing the computer of the vehicle 120 to function as the vehicle control unit 122. The above-mentioned program may be a program for causing the computer of the vehicle 120 to execute the information processing method in the vehicle control unit 122. The above-mentioned program may be a program for causing the computer of the electric power source system 128 to function as a controller of the electric power source system 128. The above-mentioned program may be a program for causing the computer of the electric power source system 128 to execute the information processing method in the electric power source system 128. The above-mentioned program may be a program for causing the computer to function as the management server 140. The above-mentioned program may be a program for causing the computer to execute the information processing method in the management server 140.

The above-mentioned information processing method may be a control method of controlling the electric power supply apparatus configured to supply the electric power to the working machine. The above-mentioned electric power supply apparatus is provided with a fuel cell, for example. The above-mentioned control method includes acquiring a restriction request for requesting restriction of the supply of the electric power from the electric power supply apparatus to the working machine via a communication network, for example. The above-mentioned control method includes restricting the supply of the electric power from the electric power supply apparatus to the working machine in a case where the restriction request is acquired in the acquiring, for example.

The above-mentioned information processing method may be a management method of managing the electric power supply apparatus configured to supply the electric power to the working machine. The above-mentioned electric power supply apparatus is provided with a fuel cell, for example. The above-mentioned management method includes detecting an occurrence of a predetermined first event related to at least one of the working machine and the electric power supply apparatus, for example. The above-mentioned management method includes transmitting, in a case where the occurrence of the first event is detected in the detecting, a restriction request for requesting restriction of the supply of the electric power from the electric power supply apparatus to the working machine to at least one of the working machine and the electric power supply apparatus via a communication network, for example.

Figure 2:
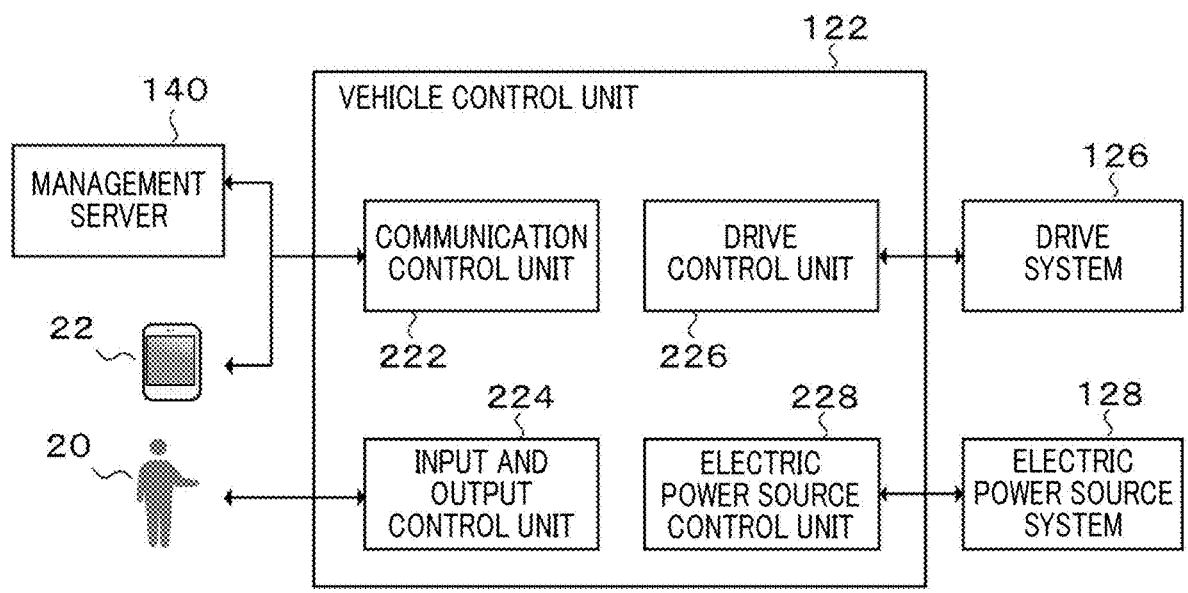
FIG. 2 schematically illustrates one example of an internal configuration of a vehicle control unit 122.

FIG. 2 schematically illustrates one example of an internal configuration of the vehicle control unit 122. According to the present embodiment, the vehicle control unit 122 is provided with a communication control unit 222, an input and output control unit 224, a drive control unit 226, and an electric power source control unit 228.

According to the present embodiment, the communication control unit 222 controls a communicate between the vehicle 120 and at least one of the communication terminal 22 and the management server 140. The communication control unit 222 may be various types of communication interfaces. The communication control unit 222 transmits information output from each unit of the vehicle control unit 122 to at least one of the communication terminal 22 and the management server 140. The communication control unit 222 may output the information acquired from at least one of the communication terminal 22 and the management server 140 to at least one of the input and output control unit 224, the drive control unit 226, and the electric power source control unit 228.

According to the present embodiment, the input and output control unit 224 controls an input apparatus configured to accept an input from the user 20. The input and output control unit 224 may transmit the information input to the input apparatus by the user 20 to the management server 140. The input and output control unit 224 may output the information input by the user 20 to the input apparatus to at least one of the drive control unit 226 and the electric power source control unit 228. Examples of the input apparatus include a touch panel, a keyboard, a pointing device, a microphone, a voice input system, a voice analysis system, a camera, a gesture input system, an image analysis system, and the like.

According to the present embodiment, the input and output control unit 224 controls an output apparatus configured to output information to the user 20. The input and output control unit 224 may output the information acquired from at least one of the communication control unit 222, the drive control unit 226, and the electric power source control unit 228 to the user 20. Examples of the output apparatus include a display, a projector, a speaker, and the like.

According to the present embodiment, the drive control unit 226 controls an operation of the drive system 126 to control movement of the vehicle 120. The drive control unit 226 controls starting, acceleration, deceleration, turning in direction, stopping, or the like of the vehicle 120, for example. In this manner, the transport work is performed.

According to the present embodiment, the electric power source control unit 228 controls the operation of the electric power source system 128 to control the supply of the electric power from the electric power source system 128 to each unit of the vehicle 120. In particular, the electric power source control unit 228 may control the supply of the electric power from the electric power source system 128 to the drive system 126.

The electric power source control unit 228 may control activation and stopping of the electric power source system 128. For example, when the input and output control unit 224 acquires an instruction for starting use of the vehicle 120 which is an instruction from the user 20, the electric power source control unit 228 transmits an instruction for activating the electric power source system 128 to the electric power source system 128. Similarly, when the input and output control unit 224 acquires an instruction for ending the use of the vehicle 120 which is an instruction from the user 20, the electric power source control unit 228 transmits an instruction for ending the electric power source system 128 to the electric power source system 128.

At least one of an output voltage, an output current, output electric power, and an output rate of the electric power source system 128 may be controlled. The electric power source control unit 228 may control an operation mode of the electric power source system 128. For example, the operation mode may be associated with an operating condition for prioritizing one or a plurality of characteristics selected from a group consisting of (i) a magnitude of the output electric power, (ii) a following property or responsiveness to the output instruction, (iii) a fuel consumption and an electric power generation efficiency, and (iv) suppression of deterioration over other characteristics that are not selected.

According to the present embodiment, in a case where the communication control unit 222 receives the restriction signal, the electric power source control unit 228 transfers the restriction signal to the electric power source control unit 228. Similarly, in a case where the communication control unit 222 receives the removal signal, the electric power source control unit 228 may transfer the removal signal to the electric power source system 128.

Figure 3:
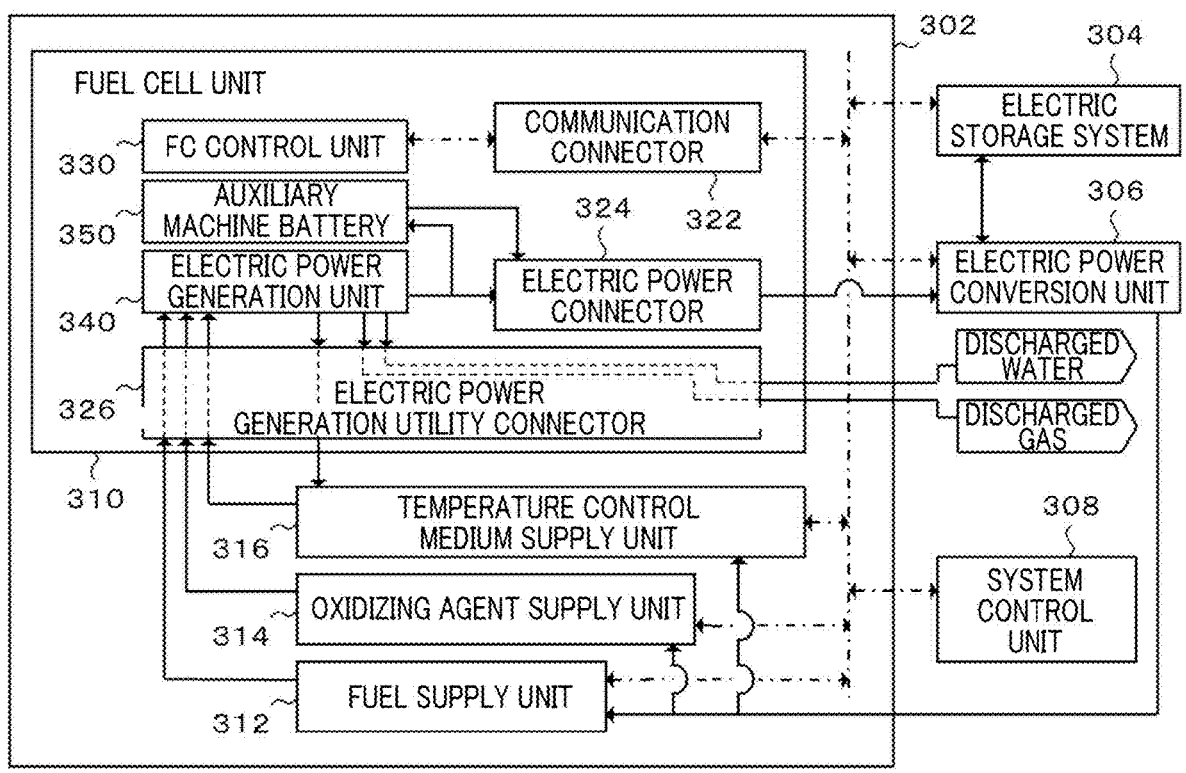
FIG. 3 schematically illustrates one example of an internal configuration of an electric power source system 128.

FIG. 3 schematically illustrates one example of an internal configuration of the electric power source system 128. According to the present embodiment, the electric power source system 128 is provided with an electric power generation system 302, an electric storage system 304, an electric power conversion unit 306, and a system control unit 308.

According to the present embodiment, the electric power generation system 302 generates electric power using the fuel cell. The electric power generation system 302 may supply the generated electric power to each unit of the vehicle 120. For example, the electric power generation system 302 supplies the generated electric power to each unit of the vehicle 120 via the electric power conversion unit 306. A detail of the electric power generation system 302 will be described below.

According to the present embodiment, the electric storage system 304 stores electric power. The electric storage system 304 receives electric power via the electric power conversion unit 306, and stores the electric power. According to one embodiment, the electric storage system 304 stores the electric power generated by the electric power generation system 302. According to another embodiment, the electric storage system 304 stores regenerative electric power from the drive system 126. The electric storage system 304 may supply the stored electric power to each unit of the vehicle 120. For example, the electric storage system 304 supplies the stored electric power to each unit of the vehicle 120 via the electric power conversion unit 306.

According to the present embodiment, the electric power conversion unit 306 converts the electric power. The electric power conversion unit 306 may convert a direct current into an alternating current, may convert an alternating current into a direct current, or may convert an input direct current voltage into another direct current voltage. The electric power conversion unit 306 may include a bidirectional DC-to-DC converter.

The electric power conversion unit 306 may switch a distribution state of the electric power. The electric power conversion unit 306 may switch a supply destination of the input electric power. The electric power conversion unit 306 may supply the electric power generated by the electric power generation system 302 to each unit of the vehicle 120. The electric power conversion unit 306 may supply the electric power generated by the electric power generation system 302 to the electric storage system 304. The electric power conversion unit 306 may supply the electric power stored by the electric storage system 304 to the electric power generation system 302. The electric power conversion unit 306 may supply the electric power stored by the electric storage system 304 to each unit of the vehicle 120.

The electric power conversion unit 306 may supply the regenerative electric power from the drive system 126 to the electric storage system 304.

According to the present embodiment, the system control unit 308 controls the electric power source system 128. To be more specific, the system control unit 308 controls an operation of at least one of the electric power generation system 302 and the electric power conversion unit 306 to adjust the output of the electric power source system 128.

According to one embodiment, the system control unit 308 controls the operation of the electric power generation system 302 to adjust the generated electric power amount. The system control unit 308 may control the operation of the electric power generation system 302 according to an instruction from the electric power source control unit 228.

For example, the system control unit 308 controls activation and stopping of the electric power generation system 302. The system control unit 308 may control at least one of an output voltage, an output current, output electric power, and an output rate of the electric power generation system 302. The system control unit 308 may control an operation mode of the electric power generation system 302.

The system control unit 308 may control the operation of the electric power generation system 302 based on the restriction signal. The system control unit 308 may control the operation of the electric power generation system 302 based on the removal signal.

According to another embodiment, the system control unit 308 controls the operation of the electric power conversion unit 306 to adjust the electric power amount supplied from the electric power source system 128 to each unit of the vehicle 120. The system control unit 308 may control the operation of the electric power conversion unit 306 according to an instruction of the electric power source control unit 228.

For example, the system control unit 308 controls whether the electric power is supplied from the electric power source system 128 to each unit of the vehicle 120. The system control unit 308 may control whether the electric power is supplied from the electric power source system 128 to particular equipment of the vehicle 120 (for example, the drive system 126). The system control unit 308 controls at least one of the output voltage, the output current, the output electric power, and the output rate of the electric power supplied from the electric power source system 128 to each unit of the vehicle 120. The system control unit 308 may adjust a balance between the electric power supplied from the electric power generation system 302 and the electric power supplied from the electric storage system 304.

The system control unit 308 may control the operation of the electric power conversion unit 306 based on the restriction signal. The system control unit 308 may control the operation of the electric power conversion unit 306 based on the removal signal. A detail of the system control unit 308 will be described below.

[Outline of Each Unit of Electric Power Generation System 302]

One example of an internal configuration of the electric power generation system 302 will be described with reference to FIG. 3. According to the present embodiment, the electric power generation system 302 is provided with a fuel cell unit 310, a fuel supply unit 312, an oxidizing agent supply unit 314, and a temperature control medium supply unit 316. According to the present embodiment, the fuel cell unit 310 is provided with a communication connector 322, an electric power connector 324, and an electric power generation utility connector 326. According to the present embodiment, the fuel cell unit 310 is provided with an FC control unit 330, an electric power generation unit 340, and an auxiliary machine battery 350.

According to the present embodiment, the fuel cell unit 310 generates electric power using a fuel supplied from the fuel supply unit 312 and a fuel supplied from the oxidizing agent supply unit 314. A temperature of the fuel cell unit 310 is adjusted by a temperature control medium supplied from the temperature control medium supply unit 316. The electric power generated by the fuel cell unit 310 is supplied to each unit of the vehicle 120 via the electric power conversion unit 306, for example. According to the present embodiment, the fuel cell unit 310 may control an operation of at least one of the fuel supply unit 312, the oxidizing agent supply unit 314, and the temperature control medium supply unit 316. The fuel cell unit 310 may operate according to an instruction from the system control unit 308.

According to the present embodiment, the fuel cell unit 310 may be a unit obtained by packaging at least the FC control unit 330, the electric power generation unit 340, a pipe, and a wire. The fuel cell unit 310 may be a unit obtained by packaging at least the FC control unit 330, the electric power generation unit 340, the auxiliary machine battery 350, a pipe, and a wire. Configuring parts of the fuel cell unit 310 may be contained in a single housing, or may be divided and contained in a plurality of housings.

According to the present embodiment, for example, the fuel cell unit 310 is connected to a utility pipe and an electric power cable arranged in the electric power generation system 302 and thereby attached to the electric power generation system 302. The fuel cell unit 310 may be connected to the utility pipe, the electric power cable, and a communication cable arranged in the electric power generation system 302 and thereby attached to the electric power generation system 302. In this manner, the fuel cell unit 310 is mounted to the vehicle 120.

According to one embodiment, the fuel cell unit 310 is attached to the electric power generation system 302 such that it is not possible for a general user of the vehicle 120 to easily detach the fuel cell unit. The fuel cell unit 310 is fixed at a predetermined position of the electric power generation system 302, for example.

According to another embodiment, the fuel cell unit 310 is attached in an attachable and detachable manner to the electric power generation system 302. In this manner, the general user of the vehicle 120 can attach the fuel cell unit 310 detached from the vehicle 120 to another working machine, and actuate the other working machine by the electric power generated by the fuel cell unit 310.

According to the present embodiment, the fuel supply unit 312 supplies a fuel for electric power generation to the fuel cell unit 310. The fuel for electric power generation may be hydrogen, or a compound containing hydrogen. The fuel supply unit 312 may be provided with a sensor (not illustrated) configured to measure a flow rate of the fuel, and a flow rate adjustment unit (not illustrated) configured to adjust the flow rate of the fuel. The fuel supply unit 312 may operate according to an instruction from the fuel cell unit 310.

According to one embodiment, the fuel is replenished from the outside to the fuel supply unit 312. The fuel supply unit 312 may have a replenishment pipe and a fuel container (not illustrated) configured to receive the fuel replenished from the outside. The fuel supply unit 312 may have a member configured to permit or prohibit an access to the replenishment pipe from the outside. The above-mentioned member may be a lid or a plug arranged at one end of the replenishment pipe. The fuel supply unit 312 may switch a state where it is not possible to detach the above-mentioned member from the replenishment pipe and a state where the above-mentioned member can be detached from the replenishment pipe according to an instruction from the system control unit 308.

According to another embodiment, the fuel supply unit 312 may have a replaceable fuel cartridge (not illustrated). The fuel supply unit 312 may switch a state where it is not possible to detach the above-mentioned fuel cartridge from the fuel supply unit 312 and a state where the above-mentioned fuel cartridge can be detached from the fuel supply unit 312 according to an instruction from the system control unit 308.

According to the present embodiment, the oxidizing agent supply unit 314 supplies an oxidizing agent for electric power generation to the fuel cell unit 310. The oxidizing agent for electric power generation may be oxygen, or may be air. The oxidizing agent supply unit 314 may be provided with a sensor (not illustrated) configured to measure a flow rate of the oxidizing agent, and a flow rate adjustment unit (not illustrated) configured to adjust a flow rate of the oxidizing agent. The oxidizing agent supply unit 314 may operate according to an instruction from the fuel cell unit 310.

The oxidizing agent supply unit 314 may have a pump or a blower (not illustrated) configured to suck air serving as the oxidizing agent from the outside of the electric power generation system 302. The oxidizing agent supply unit 314 may be connected to an air feeding pipe (not illustrated) arranged in the vehicle 120.

According to the present embodiment, the temperature control medium supply unit 316 supplies a temperature control medium for adjusting a temperature of an electric power generation stack of the fuel cell unit 310 to the fuel cell unit 310. Examples of the temperature control medium include water, ethylene glycol, long life coolant (which may be referred to as LLC), and the like. The temperature control medium supply unit 316 may be provided with a sensor (not illustrated) configured to measure a flow rate of the temperature control medium, and a flow rate adjustment unit (not illustrated) configured to adjust a flow rate of the temperature control medium. The temperature control medium supply unit 316 may operate according to an instruction from the fuel cell unit 310. The temperature control medium supply unit 316 may be provided with a heat exchanger (not illustrated) configured to adjust a temperature of the temperature control medium. Examples of the heat exchanger include a radiator.

[Outline of Each Unit of Fuel Cell Unit 310]

According to the present embodiment, the communication connector 322 connects a communication cable arranged in the fuel cell unit 310 to a communication cable arranged in the electric power generation system 302. The communication cable arranged in the fuel cell unit 310 and the communication cable arranged in the electric power generation system 302 may establish a wired connection, or may establish a wireless connection. The fuel cell unit 310 may transmit and receive information between the communication cable arranged in the electric power generation system 302 and the system control unit 308 or the vehicle control unit 122 via wireless communication equipment.

According to the present embodiment, the electric power connector 324 electrically connects an electric power cable arranged in the fuel cell unit 310 to the electric power cable arranged in the electric power generation system 302. The electric power cable arranged in the fuel cell unit 310 and the electric power cable arranged in the electric power generation system 302 may establish a wired connection, or may establish a wireless connection. The fuel cell unit 310 may be electrically connected to the vehicle 120 or the electric power conversion unit 306 via wireless power feed equipment.

In this manner, transfer of the electric power can be performed between the electric power generation system 302 and the fuel cell unit 310. As a result, the transfer of the electric power can be performed between the electric power conversion unit 306 and the fuel cell unit 310, and the transfer of the electric power can be performed between the vehicle 120 or the electric storage system 304 and the fuel cell unit 310.

According to the present embodiment, the electric power generation utility connector 326 connects a utility pipe arranged in the fuel cell unit 310 to a utility pipe arranged in the electric power generation system 302. In this manner, transfer of the utilities used for the operation of the fuel cell unit 310 can be performed between the electric power generation system 302 and the fuel cell unit 310. As a result, the transfer of the utilities can be performed between the vehicle 120 or the electric power generation system 302 and the fuel cell unit 310.

For example, the transfer of the fuel can be performed between the fuel supply unit 312 and the fuel cell unit 310. Transfer of the oxidizing agent can be performed between the oxidizing agent supply unit 314 and the fuel cell unit 310. Transfer of the temperature control medium or heat can be performed between the temperature control medium supply unit 316 and the fuel cell unit 310. In addition, transmission and reception of discharged water and discharged gas which are generated following the electric power generation in the fuel cell unit 310 can be performed between the fuel cell unit 310 and the vehicle 120 or the electric power generation system 302.

According to the present embodiment, the FC control unit 330 controls the fuel cell unit 310. For example, the FC control unit 330 controls the electric power generation of the fuel cell unit 310. The FC control unit 330 may control at least one of an output voltage, an output current, output electric power, and an output rate of the fuel cell unit 310. The FC control unit 330 may control the electric power generation of the fuel cell unit 310 by controlling an operation of at least one of the fuel supply unit 312, the oxidizing agent supply unit 314, and the temperature control medium supply unit 316. The FC control unit 330 may operate according to an instruction from the system control unit 308.

According to the present embodiment, the electric power generation unit 340 generates electricity. The electric power generation unit 340 may be provided with a fuel cell. The fuel cell causes the fuel supplied from the fuel supply unit 312 and the oxidizing agent supplied from the oxidizing agent supply unit 314 to react, and generates electricity. The electric power generation unit 340 may be electrically connected to the electric power connector 324. The electric power generation unit 340 may be electrically connected to the auxiliary machine battery 350. The electric power generation unit 340 may supply a part of the generated electricity to the auxiliary machine battery 350.

As described above, to activate the electric power generation unit 340, electric power is needed for activating the fuel supply unit 312 and the oxidizing agent supply unit 314 which are configured to supply the oxidizing agent and the fuel to the electric power generation unit. In particular, the oxidizing agent supply unit 314 is often provided with a fan for pressurizing and feeding air serving as the oxidizing agent to the electric power generation unit 340. However, the electric power consumption amount of the above-mentioned fan is relatively large. For this reason, in preparation for activation of the electric power generation unit 340, electric power to actuate the oxidizing agent supply unit 314 is preferably reserved.

According to the present embodiment, the auxiliary machine battery 350 stores electric power to activate at least one of the fuel supply unit 312, the oxidizing agent supply unit 314, and the temperature control medium supply unit 316. The auxiliary machine battery 350 may store electric power to activate the oxidizing agent supply unit 314. The auxiliary machine battery 350 may be electrically connected to the electric power connector 324. The auxiliary machine battery 350 may store the electric power supplied from the electric power conversion unit 306. The auxiliary machine battery 350 may be electrically connected to the electric power generation unit 340. The auxiliary machine battery 350 may store the electric power supplied from the electric power generation unit 340.

Note that at least one of the fuel supply unit 312, the oxidizing agent supply unit 314, and the temperature control medium supply unit 316 may be configured to actuate using the electric power supplied from the electric storage system 304 at the time of the activation of the fuel cell unit 310. At least one of the fuel supply unit 312, the oxidizing agent supply unit 314, and the temperature control medium supply unit 316 may be configured to actuate using the electric power supplied from the electric storage system 304 and the electric power generated by the fuel cell unit 310 at the time of the activation of the fuel cell unit 310.

At least one of the fuel supply unit 312, the oxidizing agent supply unit 314, and the temperature control medium supply unit 316 may be configured to actuate using the electric power supplied from the electric storage system 304 in a case where a remaining capacity of the auxiliary machine battery 350 is out of range of a predetermined numerical range at the time of the activation of the fuel cell unit 310.

The "numerical range" is not limited to a case where both an upper limit and a lower limit are set. For the "numerical range", only an upper limit may be set, or only a lower limit may be set.

After the generated electric power amount of the electric power generation unit 340 satisfies a predetermined condition, the oxidizing agent supply unit 314 may actuate using the electric power generated by the electric power generation unit 340. For example, in a case where the generated electric power amount of the electric power generation unit 340 is lower than a predetermined threshold, the oxidizing agent supply unit 314 supplies the oxidizing agent to the electric power generation unit 340 using the electric power supplied from the auxiliary machine battery 350 or the electric storage system 304. In a case where the generated electric power amount of the electric power generation unit 340 is higher than the above-mentioned threshold, the oxidizing agent supply unit 314 supplies the oxidizing agent to the electric power generation unit 340 using the electric power generated by the electric power generation unit 340.

The supply amount of the oxidizing agent in a case where the oxidizing agent supply unit 314 uses the electric power supplied from the auxiliary machine battery 350 or the electric storage system 304 may be lower than the supply amount of the oxidizing agent in a case where the oxidizing agent supply unit 314 uses the electric power generated by the electric power generation unit 340. In a case where the oxidizing agent supply unit 314 uses the electric power generated by the electric power generation unit 340, the supply amount of the oxidizing agent may vary according to the magnitude of the electric power generated by the electric power generation unit 340. The supply amount of the oxidizing agent may continuously vary or may vary in a stepwise manner according to the magnitude of the electric power generated by the electric power generation unit 340.

Note that according to the present embodiment, the detail of the fuel cell unit 310 has been described while a case is used as an example where the fuel cell unit 310 does not include the fuel supply unit 312, the oxidizing agent supply unit 314, and the temperature control medium supply unit 316. However, the fuel cell unit 310 is not limited to the present embodiment. According to the present embodiment, the fuel cell unit 310 may include at least one of the fuel supply unit 312, the oxidizing agent supply unit 314, and the temperature control medium supply unit 316.

According to the present embodiment, the detail of the electric power source system 128 has been described while a case is used as an example where the fuel cell unit 310 is the packaged unit. However, the electric power source system 128 is not limited to the present embodiment. According to another embodiment, the electric power generation system 302 may be a packaged unit. According to still another embodiment, the electric power source system 128 may be a packaged unit.

According to the present embodiment, the detail of the electric power source system 128 has been described while a case is used as an example where the fuel cell unit 310 is configured to attachable and detachable to the electric power generation system 302. However, the electric power source system 128 is not limited to the present embodiment. According to another embodiment, the electric power generation system 302 may be configured to be attachable and detachable to the electric power source system 128. According to still another embodiment, the electric power source system 128 may be configured to be attachable and detachable to the vehicle 120.

Figure 4:
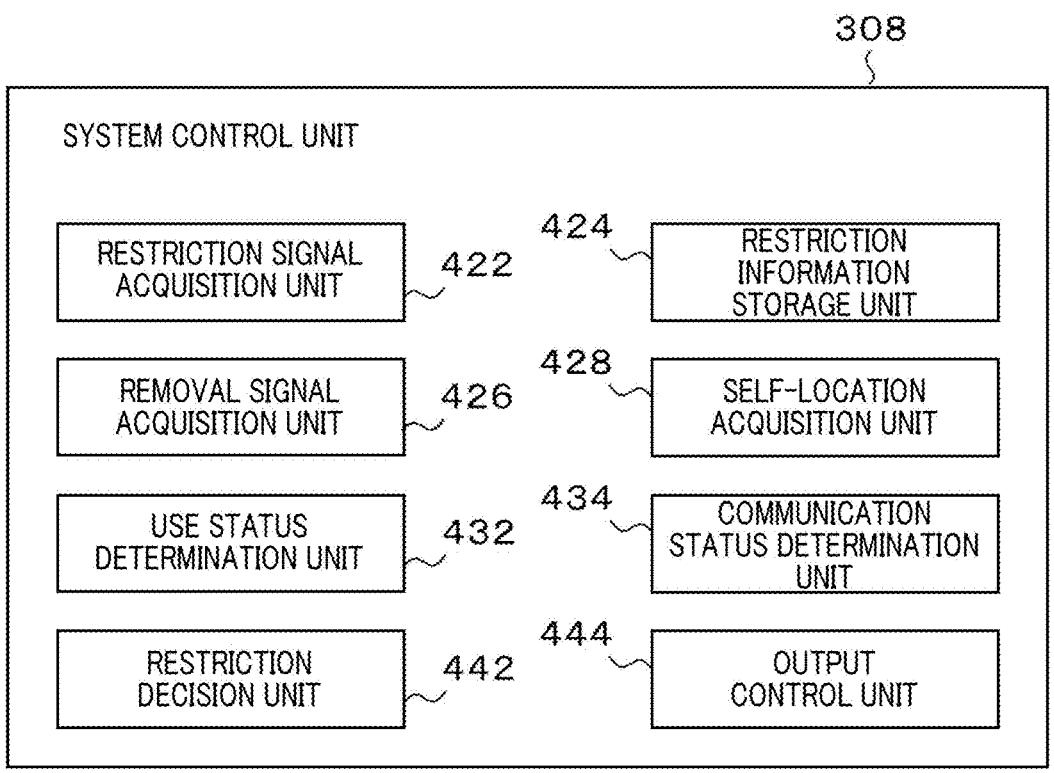
FIG. 4 schematically illustrates one example of an internal configuration of a system control unit 308.

FIG. 4 schematically illustrates one example of an internal configuration of the system control unit 308. According to the present embodiment, the system control unit 308 is provided with a restriction signal acquisition unit 422, a restriction information storage unit 424, a removal signal acquisition unit 426, a self-location acquisition unit 428, a use status determination unit 432, a communication status determination unit 434, a restriction decision unit 442, and an output control unit 444.

According to the present embodiment, the restriction signal acquisition unit 422 receives a signal for requesting restriction of the supply of the electric power from the electric power source system 128 to each or a part of the units of the vehicle 120 (which may be referred to as a restriction signal). The restriction signal is transmitted from the management server 140, for example. When the restriction signal is received, the restriction signal acquisition unit 422 may output information indicating that the restriction signal is received to the restriction decision unit 442. For example, the restriction signal acquisition unit 422 transfers the restriction signal to the restriction decision unit 442.

The restriction signal may include information indicating a condition related to the execution of the restriction. The restriction signal acquisition unit 422 may store information indicating the condition related to the execution of the restriction in the restriction information storage unit 424.

According to the present embodiment, the restriction information storage unit 424 stores the information indicating the condition related to the execution of the restriction. Examples of the information indicating the condition related to the execution of the restriction include information indicating an area where the execution of the restriction is permitted, information indicating an area where the execution of the restriction is prohibited, information indicating an area where the execution of the restriction may be suspended, information indicating a period in which the execution of the restriction is permitted, information indicating a period in which the execution of the restriction is prohibited, information indicating a period in which the execution of the restriction may be suspended, information indicating a time slot in which the execution of the restriction is permitted, information indicating a time slot in which the execution of the restriction is prohibited, information indicating a time slot in which the execution of the restriction may be suspended, information indicating a communication status in which the execution of the restriction is permitted, information indicating a communication status in which the execution of the restriction is prohibited, information indicating a communication status in which the execution of the restriction may be suspended, and the like.

The restriction information storage unit 424 may store information indicating an execution situation of the restriction. For example, the restriction information storage unit 424 stores information indicating whether the supply of the electric power is restricted at a present moment. The restriction information storage unit 424 may store information indicating contents of the restriction. In response to a request from the restriction decision unit 442 or the output control unit 444, the restriction information storage unit 424 may extract information matched with the request.

According to the present embodiment, the removal signal acquisition unit 426 receives a signal for requesting removal of the above-mentioned restriction related to the electric power supply (which may be referred to as a removal signal). The removal signal is transmitted from the management server 140, for example. When the removal signal is received, the removal signal acquisition unit 426 may output information indicating that the removal signal is received to the restriction decision unit 442. For example, the restriction signal acquisition unit 422 transfers the removal signal to the restriction decision unit 442.

According to the present embodiment, the self-location acquisition unit 428 acquires information indicating a current location of the vehicle 120. For example, the self-location acquisition unit 428 acquires, from the vehicle control unit 122, information indicating an estimated value of the current location of the vehicle 120 which is output by the self-location estimation unit 124. The self-location acquisition unit 428 may output the information indicating the current location of the vehicle 120 to the restriction decision unit 442.

According to the present embodiment, the use status determination unit 432 determines a use status of the vehicle 120. Examples of the use status of the vehicle 120 include start of use of the vehicle 120 by the user 20, use of the vehicle 120 by the user 20, end of the use of the vehicle 120 by the user 20, and the like. The use status determination unit 432 may output information indicating a determination result to the restriction decision unit 442.

According to one embodiment, the use status determination unit 432 detects the start of the use of the vehicle 120. As described above, for example, when the input and output control unit 224 acquires an instruction for starting the use of the vehicle 120 which is an instruction from the user 20, the electric power source control unit 228 transmits an instruction for activating the electric power source system 128 to the electric power source system 128. The instruction for starting the use of the vehicle 120 may be turning an activation switch or an ignition key of the vehicle 120 ON. When the instruction for activating the electric power source system 128 is received, the use status determination unit 432 may detect the start of the use of the vehicle 120.

According to another embodiment, the use status determination unit 432 detects the end of the use of the vehicle 120. As described above, for example, when the input and output control unit 224 acquires an instruction for ending the use of the vehicle 120 which is an instruction from the user 20, the electric power source control unit 228 transmits an instruction for ending the electric power source system 128 to the electric power source system 128. The instruction for ending the use of the vehicle 120 may be turning the activation switch or the ignition key of the vehicle 120 OFF. When the instruction for ending the electric power source system 128 is received, the use status determination unit 432 may detect the end of the use of the vehicle 120.

According to the present embodiment, the communication status determination unit 434 determines a communication status of the vehicle 120. The communication status determination unit 434 may analyze communications between the communication control unit 222, and the communication terminal 22 and the management server 140, and determine the communication status of the vehicle 120, for example. The communication status determination unit 434 may output information indicating a determination result to the restriction decision unit 442.

Examples of the communication status of the vehicle 120 include information related to whether a communication can be performed, whether a radio wave status is satisfactory, whether a communication quality is satisfactory, a type of a communication method in which a communication can be performed, a type of a communication carrier with which a communication can be performed, and the like. Examples of the radio wave status include a radio wave reception level, a radio wave intensity, received signal code power (RSCP), a cell ID (CID), and the like. Examples of the communication quality include a communication speed, a throughput of data communication, a latency of the data communication, and the like.

According to the present embodiment, in a case where the restriction signal acquisition unit 422 acquires the restriction signal, the restriction decision unit 442 decides restriction of the supply of the electric power from the electric power source system 128 to each or a part of the units of the vehicle 120. After the restriction signal acquisition unit 422 acquires the restriction signal, the restriction decision unit 442 may decide execution of the above-mentioned restriction related to the electric power supply at appropriate timing. In a case where the removal signal acquisition unit 426 acquires the removal signal, the restriction decision unit 442 decides removal of the above-mentioned restriction related to the electric power supply.

[Specific Example Related to Timing for Starting Restriction]

As described above, the restriction decision unit 442 may acquire the information indicating that the restriction signal is received from the restriction signal acquisition unit 422. The restriction signal acquisition unit 422 may access the restriction information storage unit 424, and acquire information indicating a condition related to the execution of the restriction. The restriction decision unit 442 may acquire information indicating that the removal signal is received from the removal signal acquisition unit 426. The restriction signal acquisition unit 422 may acquire information indicating the current location of the vehicle 120 from the self-location acquisition unit 428. The restriction signal acquisition unit 422 may acquire information indicating the determination result related to the use status of the vehicle 120 from the use status determination unit 432. The restriction signal acquisition unit 422 may acquire information indicating the determination result related to the communication status of the vehicle 120 from the communication status determination unit 434.

According to one embodiment, in a case where, after the restriction signal acquisition unit 422 acquires the restriction signal, the use status determination unit 432 detects the end of the use of the vehicle 120, the restriction decision unit 442 may decide to start the above-mentioned restriction related to the electric power supply. In a case where, after the restriction signal acquisition unit 422 acquires the restriction signal and the use status determination unit 432 detects the end of the use of the vehicle 120, the use status determination unit 432 detects the start of the use of the vehicle 120, the restriction decision unit 442 may decide to start the above-mentioned restriction related to the electric power supply.

In this manner, an unusable situation of the vehicle 120 is suppressed while the user 20 drives the vehicle 120. In addition, in a case where the user 20 stops the use of the vehicle 120, the vehicle 120 is likely to be stopped at a destination point or an appropriate stopping point. For this reason, even in a case where the electric power supply from the electric power source system 128 to the vehicle 120 is restricted, the user 20 is likely to be able to pay the usage fee of the vehicle 120 or take a rest outside the vehicle. Furthermore, after the restriction signal acquisition unit 422 acquires the restriction signal, at relatively early timing, the electric power supply from the electric power source system 128 to the vehicle 120 is restricted. As a result, shortening of a collection period of the usage fee, suppression of worsening of theft damage, or the like is anticipated.

According to another embodiment, in a case where a geographic relationship between the location of the vehicle 120 and the location of the area where the execution of the restriction is permit satisfies a predetermined condition, the restriction decision unit 442 may decide to start the above-mentioned restriction related to the electric power supply. Examples of the above-mentioned predetermined condition include (i) a condition where the vehicle 120 is located inside the area where the execution of the restriction is permitted, (ii) a condition where a distance between the location of the vehicle 120 and the location of the area where the execution of the restriction is permitted is smaller than a predetermined value, and the like.

In a case where the geographic relationship between the location of the vehicle 120 and the location of the area where the execution of the restriction is prohibited satisfies a predetermined condition, the restriction decision unit 442 may decide to start the above-mentioned restriction related to the electric power supply. Examples of the above-mentioned predetermined condition include (i) a condition where the vehicle 120 is not located inside the area where the execution of the restriction is prohibited, (ii) a condition where the distance between the location of the vehicle 120 and the location of the area where the execution of the restriction is permitted is larger than a predetermined value, and the like.

According to another embodiment, the restriction decision unit 442 may decide whether the restriction of the supply of the electric power is started based on the communication status of the vehicle 120. For example, in a case where the communication status of the vehicle 120 is satisfactory, the restriction signal acquisition unit 422 may start the above-mentioned restriction related to the electric power supply. On the other hand, in a case where the communication status of the vehicle 120 is not satisfactory, the restriction signal acquisition unit 422 may suspend the above-mentioned restriction related to the electric power supply.

According to still another embodiment, the restriction decision unit 442 may decide whether the restriction of the supply of the electric power is started based on a situation of a surrounding environment of the vehicle 120. For example, in a case where a weather condition of the surrounding of the vehicle 120 satisfies a predetermined condition, the restriction decision unit 442 may start the above-mentioned restriction related to the electric power supply. On the other hand, in a case where the weather condition of the surrounding of the vehicle 120 does not satisfy the predetermined condition, the restriction signal acquisition unit 422 may suspend the above-mentioned restriction related to the electric power supply.

Examples of the predetermined condition include a condition where the temperature is within a predetermined numerical range, a condition where an index or an indicator decided based on at least the temperature is within a predetermined numerical range, and the like. Examples of the above-mentioned index include a heat index or a wet-bulb globe temperature (which may be abbreviated as WBGT), a temperature-humidity index (which may be abbreviated as THI), a predicted mean vote on thermal sensation (which may be abbreviated as PMV), a standard effective temperature (which may be abbreviated as SET), and the like.

According to the present embodiment, in a case where the restriction signal acquisition unit 422 acquires the restriction signal, the output control unit 444 restricts the supply of the electric power from the electric power source system 128 to each or a part of the units of the vehicle 120. In a case where the restriction decision unit 442 decides to start the above-mentioned restriction related to the electric power supply, the output control unit 444 may execute the above-mentioned restriction.

For example, the output control unit 444 restricts the supply of the electric power by at least one of (i) a unit configured to stop at least one of supply and reception of the electric power, (ii) a unit configured to set a supply amount of the electric power or an upper limit value of the supply amount to be lower than a predetermined value, (iii) a unit configured to prohibit activation of the fuel cell, (iv) a unit configured to prohibit electric power generation of the fuel cell, (v) a unit configured to set output electric power of the fuel cell or an upper limit value of the output electric power to be lower than a predetermined value, (vi) a unit configured to set an output rate of the fuel cell or an upper limit value of the output rate to be lower than a predetermined threshold, (vii) a unit configured to prohibit replenishment of a fuel of the fuel cell, (viii) a unit configured to prohibit detachment of the fuel cell or detachment of a fuel cartridge of the fuel cell, and (ix) a unit configured to set a replenishable amount of the fuel of the fuel cell to be lower than a predetermined value. The replenishable amount of the fuel may be an upper limit value of the fuel replenishment amount per replenishment, or may be an upper limit value of the fuel replenishment amount over a certain period of time.

When the supply of the electric power from the electric power source system 128 to the vehicle 120 is stopped, it is not possible for the vehicle 120 to move. When the electric power source system 128 stops receiving the electric power from the vehicle 120, it is not possible to perform charging of the electric storage system 304 or collection of the regenerative electric power, for example. In this state, when the vehicle 120 continues actuating, a remaining capacity of the electric storage system 304 is decreased. When the remaining capacity of the electric storage system 304 is lower than a predetermined value, a restriction may be imposed on a part of the operations of the vehicle 120.

When the supply amount of the electric power from the electric power source system 128 to the vehicle 120 is decreased, it is not possible for the vehicle 120 to move at a high speed, for example. When the activation of the fuel cell is prohibited or the electric power generation of the fuel cell is prohibited, the vehicle 120 can only actuate within a remaining capacity range of the electric storage system 304. Examples of a method of prohibiting the electric power generation include a method of stopping the supply of the oxidizing agent, a method of stopping the supply of the fuel, and the like.

When the output electric power of the fuel cell is decreased, it is not possible for the vehicle 120 to move at a high speed, for example. When the output rate of the fuel cell is decreased, acceleration performance of the vehicle 120 is decreased, for example. Examples of a method of adjusting the output electric power or the output rate of the fuel cell include a method of adjusting the output by the electric power conversion unit 306, a method of adjusting a speed of the supply of the fuel or the oxidizing agent, and the like.

When the replenishment of the fuel of the fuel cell is prohibited, the vehicle 120 can only actuate within a range of the remaining amount of the fuel and the remaining capacity of the electric storage system 304. Examples of a method of prohibiting the replenishment of the fuel of the fuel cell include a method of keeping a feeding port of the fuel closed, a method of blocking insertion of a fuel supply nozzle to the feeding port of the fuel, a method of transmitting a signal indicating that the supply of the fuel to a fuel supply apparatus is prohibited, and the like.

When the detachment of the fuel cell or the detachment of the fuel cartridge of the fuel cell is prohibited, after the vehicle 120 uses up the fuel, a state of fuel shortage is maintained. When the replenishable amount of the fuel of the fuel cell is lower than the predetermined value, a period of time in which the vehicle 120 can actuate per replenishment is shortened. Examples of a method of restricting the replenishable amount of the fuel include a method of transmitting a signal indicating an upper limit value of the replenishable amount of the fuel to the fuel supply apparatus, and the like.

The output control unit 444 may execute the above-mentioned restriction in a stepwise manner. According to one embodiment, the output control unit 444 performs a particular type of restriction, and increases an intensity of the restriction in a stepwise manner. The number of steps is not specifically limited. The number of steps may be two or more, may be three or more, may be four or more, or may be five or more.

For example, first, the output control unit 444 changes the upper limit value of the output rate of the fuel cell to a value lower than a normal value. In this manner, the acceleration performance of the vehicle 120 is decreased. As a result, the user 20 of the vehicle 120 can foresee that the electric power supply to the vehicle 120 is to be further restricted in the future.

Subsequently, when a predetermined condition is established before the removal signal acquisition unit 426 acquires the removal signal, the output control unit 444 changes the upper limit value of output rate to a still lower value. Examples of the predetermined condition include a condition where the generated electric power amount of the fuel cell exceeds a certain value, a condition where the electric power consumption amount of the vehicle 120 exceeds a certain value, a condition where a duty time of the vehicle 120 exceeds a certain value, a condition where a certain period of time elapses, and the like.

According to another embodiment, first, as a first step, the output control unit 444 performs a first type of restriction. Then, as a second stage, a second type of restriction is performed. The number of steps is not specifically limited. The number of steps may be two or more, may be three or more, may be four or more, or may be five or more. In addition, in each step, the intensity of the restriction may be increased in a stepwise manner.

For example, when a period of the arrear of the usage fee of the vehicle 120 exceeds a certain value, the restriction signal acquisition unit 422 receives the restriction signal. When the restriction signal acquisition unit 422 receives the restriction signal, as the first step, the output control unit 444 restricts the upper limit value of the output rate of the electric power source system 128 or the fuel cell. In this manner, the acceleration performance of the vehicle 120 is decreased. As a result, the user 20 of the vehicle 120 can foresee that the electric power supply to the vehicle 120 is to be further restricted in the future.

Subsequently, when a predetermined condition is established before the removal signal acquisition unit 426 acquires the removal signal, as the second stage, the output control unit 444 sets the upper limit value of the supply amount of the electric power to the vehicle 120 to be lower than a predetermined value. Examples of the predetermined condition include a condition where the generated electric power amount of the fuel cell exceeds a certain value, a condition where the electric power consumption amount of the vehicle 120 exceeds a certain value, a condition where the duty time of the vehicle 120 exceeds a certain value, a condition where a certain period of time elapses, and the like. In this manner, the output of the drive system 126 of the vehicle 120 is restricted. As a result, a maximum speed of the vehicle 120 is restricted.

Subsequently, when a predetermined condition is further established before the removal signal acquisition unit 426 acquires the removal signal, as a third step, the output control unit 444 prohibits the activation of the fuel cell for a next time or restricts the replenishment of the fuel. As a result, for example, unless the arrear state of the usage fee is eliminated, eventually, it is not possible for the user 20 to continue using the vehicle 120.

The output control unit 444 may select a method of restricting the electric power supply according to a situation of the vehicle 120. Examples of the situation of the vehicle 120 include a current location of the vehicle 120, a duty status of the vehicle 120, a communication status of the vehicle 120, a surrounding environment of the vehicle 120, and the like.

According to one embodiment, in a case where the vehicle 120 is stopped at a predetermined stopping location, the method of restricting the electric power supply is not specifically restricted. For example, as the method of restricting the electric power supply, the output control unit 444 selects (i) stopping the supply of the electric power from the electric power source system 128 to the vehicle 120, or (ii) prohibiting the activation or the electric power generation of the fuel cell. Examples of the predetermined stopping location include (i) a parking lot situated near a home or a work place of the user 20, (ii) a parking lot run by an authority or a private company, and the like.

On the other hand, in a case where a distance between the current location of the vehicle 120 and the predetermined stopping location is larger than a predetermined value, as the method of restricting the electric power supply, the output control unit 444 may select (i) setting the supply amount of the electric power from the electric power source system 128 to the vehicle 120 or an upper limit value of the supply amount to be lower than a rated value, (ii) setting an upper limit value of the output rate of the electric power source system 128 or the fuel cell to be lower than a normal value, (iii) prohibiting the replenishment of the fuel, (iv) prohibiting the detachment of the fuel cell or the detachment of the fuel cartridge of the fuel cell, or (v) setting the replenishable amount of the fuel to be lower than a normal value. According to the present embodiment, even in a case where the electric power supply to the vehicle 120 is restricted, the vehicle 120 can safely move to a parking space or a fuel station.

According to another embodiment, in a case where the communication status of the vehicle 120 is satisfactory, the method of restricting the electric power supply is not specifically restricted. For example, as the method of restricting the electric power supply, the output control unit 444 selects (i) setting the supply amount of the electric power from the electric power source system 128 to the vehicle 120 or an upper limit value of the supply amount to be lower than a rated value, (ii) setting an upper limit value of the output rate of the electric power source system 128 or the fuel cell to be lower than a normal value, (iii) prohibiting the replenishment of the fuel, (iv) prohibiting the detachment of the fuel cell or the detachment of the fuel cartridge of the fuel cell, or (v) setting the replenishable amount of the fuel to be lower than a normal value.

On the other hand, in a case where the communication status of the vehicle 120 is not satisfactory, as the method of restricting the electric power supply, the output control unit 444 may select (i) setting the supply amount of the electric power from the electric power source system 128 to the vehicle 120 or an upper limit value of the supply amount to be lower than a rated value, or (ii) setting an upper limit value of the output rate of the electric power source system 128 or the fuel cell to be lower than a normal value. According to the present embodiment, the vehicle 120 can move to a location where the communication status is satisfactory without falling into fuel shortage.

According to still another embodiment, in a case where a weather condition around the vehicle 120 satisfies a predetermined condition, the method of restricting the electric power supply is not specifically restricted. For example, as the method of restricting the electric power supply, the output control unit 444 selects (i) stopping the supply of the electric power from the electric power source system 128 to the vehicle 120, or (ii) prohibiting the activation or the electric power generation of the fuel cell.

On the other hand in a case where the weather condition around the vehicle 120 does not satisfy the predetermined condition, (i) setting the supply amount of the electric power from the electric power source system 128 to the vehicle 120 or an upper limit value of the supply amount to be lower than a rated value, (ii) setting an upper limit value of the output rate of the electric power source system 128 or the fuel cell to be lower than a normal value, (iii) prohibiting the replenishment of the fuel, (iv) prohibiting the detachment of the fuel cell or the detachment of the fuel cartridge of the fuel cell, or (v) setting the replenishable amount of the fuel to be lower than a normal value may be selected. Examples of the predetermined condition include a condition where a temperature is within a predetermined numerical range, a condition where an index or an indicator decided based on at least the temperature is within a predetermined numerical range, and the like. Examples of the above-mentioned index include a heat index or a wet-bulb globe temperature (which may be abbreviated as WBGT), a temperature-humidity index (which may be abbreviated as THI), a predicted mean vote on thermal sensation (which may be abbreviated as PMV), a standard effective temperature (which may be abbreviated as SET), and the like. According to the present embodiment, even in a case where the electric power supply to the vehicle 120 is restricted, for example, the vehicle 120 can move to a predetermined parking space or fuel station, or air-conditioning equipment of the vehicle 120 can continue the duty.

The restriction signal acquisition unit 422 may be one example of a restriction request acquisition unit. The removal signal acquisition unit 426 may be one example of a removal request acquisition unit. The use status determination unit 432 may be one example of an end detection unit and a start detection unit. The restriction decision unit 442 may be one example of a restriction unit. The output control unit 444 may be one example of the restriction unit. The restriction signal may be one example of a restriction request. The removal signal may be one example of a removal request.

Figure 5:
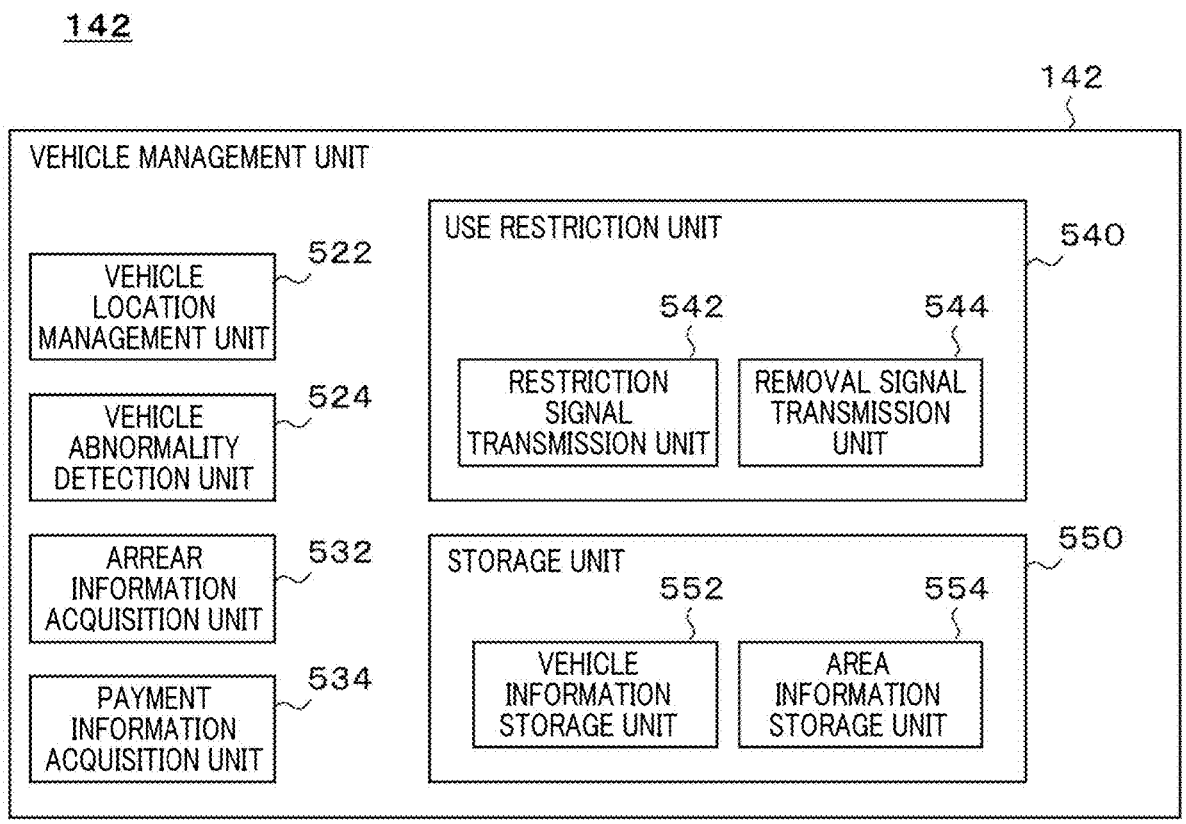
FIG. 5 schematically illustrates one example of a vehicle management unit 142.

FIG. 5 schematically illustrates one example of the vehicle management unit 142. According to the present embodiment, the vehicle management unit 142 is provided with a vehicle location management unit 522, a vehicle abnormality detection unit 524, an arrear information acquisition unit 532, a payment information acquisition unit 534, a use restriction unit 540, and a storage unit 550. According to the present embodiment, the use restriction unit 540 has a restriction signal transmission unit 542 and a removal signal transmission unit 544. The storage unit 550 has a vehicle information storage unit 552 and an area information storage unit 554.

According to the present embodiment, the vehicle location management unit 522 manages location information of each of one or more of the vehicles 120. The vehicle location management unit 522 may manage location information of each of one or more of the electric power source systems 128. The location of the electric power source system 128 may be a location of the vehicle 120 to which the electric power source system is mounted. For example, at any timing, the vehicle location management unit 522 acquires, from each of one or more of the vehicles 120, information indicating the location of the vehicle 120 at the timing. The vehicle location management unit 522 associates and stores the information indicating the location of the vehicle 120 and information indicating a time at which the information is acquired with each other in the vehicle location management unit 522, for example.

According to the present embodiment, the vehicle abnormality detection unit 524 detects an abnormality that occurs in at least one of one or more of the vehicles 120. The vehicle abnormality detection unit 524 may detect an abnormality that occurs in at least one of one or more of the electric power source systems 128. Examples of the above-mentioned abnormality include a failure, a theft, a loss, and the like. For example, the vehicle abnormality detection unit 524 acquires information indicating that a failure has occurred in the vehicle 120 or the electric power source system 128 from the vehicle 120. For example, the vehicle abnormality detection unit 524 acquires information indicating a theft or a loss of the vehicle 120 or the electric power source system 128 from the communication terminal 22. For example, the vehicle location management unit 522 stores the information indicating that the abnormality has occurred in the vehicle 120 or the electric power source system 128 in the vehicle location management unit 522.

The vehicle abnormality detection unit 524 may detect that the abnormality that occurs in at least one of one or more of the vehicles 120 is eliminated. For example, the vehicle location management unit 522 stores the information indicating that the abnormality of the vehicle 120 or the electric power source system 128 is eliminated in the vehicle location management unit 522.

According to the present embodiment, for example, the arrear information acquisition unit 532 acquires information indicating that the usage fee of the vehicle 120 or the electric power source system 128 is in arrears (which may be referred to as arrear information) from the payment settlement management unit 144. For example, the vehicle location management unit 522 stores the information indicating that the usage fee of the vehicle 120 or the electric power source system 128 is in arrears in the vehicle location management unit 522.

According to the present embodiment, for example, the payment information acquisition unit 534 acquires information indicating that the usage fee of the vehicle 120 or the electric power source system 128 is paid from the payment settlement management unit 144. For example, the vehicle location management unit 522 stores the information indicating that the usage fee of the vehicle 120 or the electric power source system 128 is paid (which may be referred to as payment information) in the vehicle location management unit 522.

According to the present embodiment, the use restriction unit 540 generates at least one of the restriction signal and the removal signal described above. The use restriction unit 540 transmits the generated signal to the corresponding vehicle 120 or electric power source system 128.

According to the present embodiment, the restriction signal transmission unit 542 generates the above-mentioned restriction signal in at least one of a case where the vehicle abnormality detection unit 524 detects the abnormality of the vehicle 120 and a case where the arrear information acquisition unit 532 acquires the arrear information. The restriction signal transmission unit 542 transmits the generated restriction signal to the corresponding vehicle 120 or electric power source system 128.

At appropriate timing, the restriction signal transmission unit 542 may transmit the generated restriction signal to the corresponding vehicle 120 or electric power source system 128. For example, the restriction signal transmission unit 542 refers to the vehicle information storage unit 552, and acquires information indicating a current location of the vehicle 120 or the electric power source system 128. In addition, the restriction signal transmission unit 542 refers to the area information storage unit 554, and determines whether a geographic relationship between the current location of the vehicle 120 or the electric power source system 128 and the location of the area where the execution of the restriction is permitted satisfies a predetermined condition (which may be referred to as a first geographic condition). In a case where the geographic relationship between the current location of the vehicle 120 or the electric power source system 128 and the location of the area where the execution of the restriction is permitted satisfies the first geographic condition, the restriction signal transmission unit 542 transmits the restriction signal to the corresponding vehicle 120 or electric power source system 128. Examples of the first geographic condition include (i) a condition where the vehicle 120 is located within the area where the execution of the restriction is permitted, (ii) a condition where a distance between the location of the vehicle 120 and the location of the area where the execution of the restriction is permitted is smaller than a predetermined value, and the like.

The restriction signal transmission unit 542 may transmit information indicating a condition related to the execution of the restriction, together with the generated restriction signal or in association with the restriction signal, to the corresponding vehicle 120 or electric power source system 128. For example, the restriction signal transmission unit 542 refers to the area information storage unit 554, and extracts and an area satisfying a predetermined second geographic condition with the vehicle 120 and the electric power source system 128 out of the area where the execution of the restriction is allowed and the area where the execution of the restriction is prohibited. Examples of the second geographic condition include (i) a condition where the vehicle 120 is located within the area, (ii) a condition where a distance between the location of the vehicle 120 and the location of the area is smaller than a predetermined value, and the like. The restriction signal transmission unit 542 transmits information indicating a type and a location of the extracted area, together with a restriction signal or in association with the restriction signal, to the corresponding vehicle 120 or electric power source system 128.

According to the present embodiment, in at least one of a case where the vehicle abnormality detection unit 524 detects that the abnormality of the vehicle 120 is eliminated and a case where the payment information acquisition unit 534 acquires the payment information, the removal signal transmission unit 544 generates the above-mentioned removal signal. The removal signal transmission unit 544 transmits the generated removal signal to the corresponding vehicle 120 or electric power source system 128.

According to the present embodiment, the storage unit 550 stores various types of information. According to the present embodiment, the vehicle information storage unit 552 stores various types of information related to each of one or more of the vehicles 120. A detail of the information stored in the vehicle information storage unit 552 will be described below. According to the present embodiment, the area information storage unit 554 stores area information indicating a location of at least one of the area where the execution of the restriction is allowed and the area where the execution of the restriction is prohibited. The area information may be a white list format, or may be a black list format.

The vehicle location management unit 522 may be one example of a location information acquisition unit. The vehicle abnormality detection unit 524 may be one example of an event detection unit. The arrear information acquisition unit 532 may be one example of the event detection unit. The payment information acquisition unit 534 may be one example of the event detection unit. The restriction signal transmission unit 542 may be one example of a restriction request transmission unit, an area extraction unit, and a location determination unit. The removal signal transmission unit 544 may be one example of a removal request transmission unit. The area information storage unit 554 may be one example of an area information storage unit.

FIG. 6 schematically illustrates one example of a data table 600. Each of rows of the data table 600 may be one example of vehicle information stored in the vehicle information storage unit 552. According to the present embodiment, data table 600 stores a vehicle ID 622 for identifying each of the vehicles, information indicating a time 624, information indicating a vehicle location 626, information indicating a situation 628 of the vehicle, information indicating a situation 630 of the electric power source, information indicating a payment status 632 of the fee, and information indicating a restriction status 634 of the usage in association with one another.

According to the present embodiment, the information indicating the vehicle location 626 indicates the location of the vehicle 120 at the time 624. Examples of the location of the vehicle 120 include an address of the location, a name of a facility arranged at the location, location coordinates of the location, and the like. The location coordinates may represent a particular location by a latitude and a longitude, or may represent a particular location by a latitude, a longitude, and an altitude. The location of the vehicle 120 may be one example of a location of the electric power source system 128. According to the present embodiment, examples of the information indicating the vehicle situation 628 include information indicating the use status of the vehicle 120, information indicating the presence or absence of an occurrence of an abnormality, and the like. According to the present embodiment, examples of the information indicating the situation 630 of the electric power source include information indicating the use status of the electric power source system 128, information indicating the presence or absence of the occurrence of the abnormality, and the like.

Figure 7:
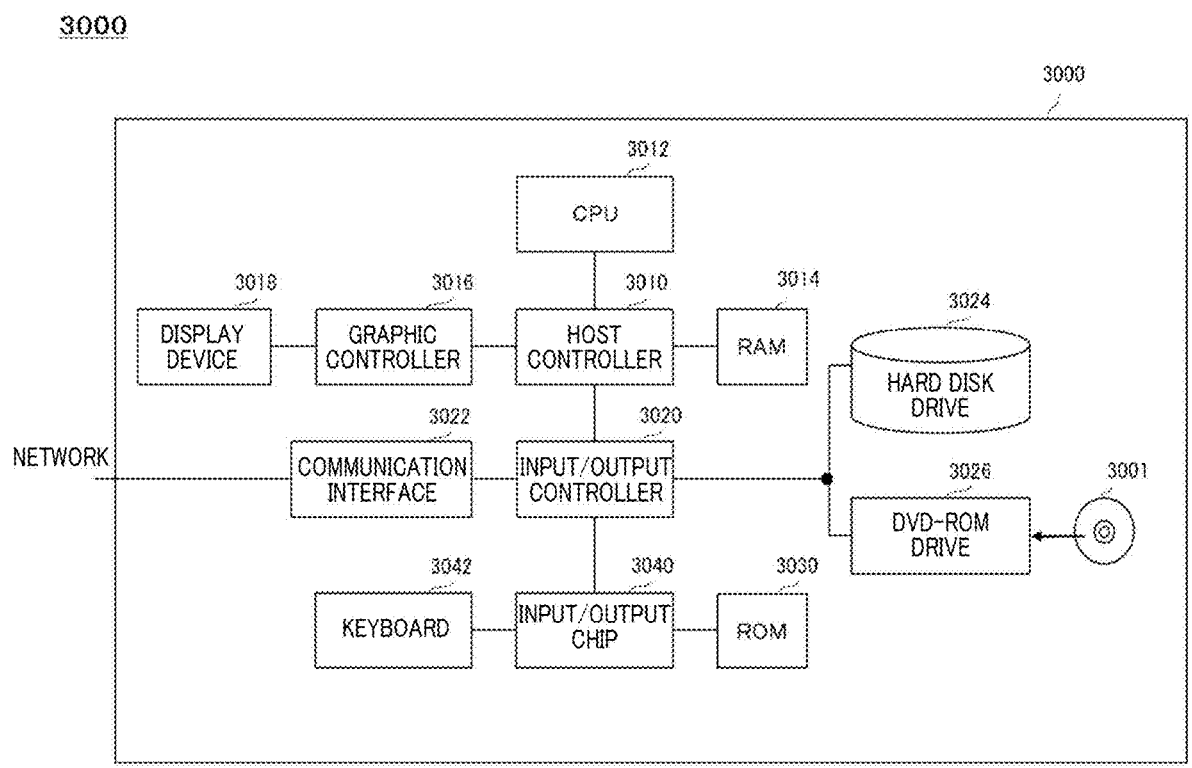
FIG. 7 schematically illustrates one example of a system configuration of a computer 3000.

FIG. 7 illustrates one example of a computer 3000 in which a plurality of aspects of the present invention may be entirely or partially embodied. According to the present embodiment, at least a part of the vehicle management system 100 is realized by the computer 3000. A part of the vehicle 120 may be realized by the computer 3000. For example, at least one of the vehicle control unit 122, the system control unit 308, and the FC control unit 330 is realized by the computer 3000. The management server 140 or a part of the management server may be realized by the computer 3000.

A program that is installed in the computer 3000 can cause the computer 3000 to perform operations associated with apparatuses of the embodiments of the present invention or to function as one or more "units" thereof, and/or cause the computer 3000 to perform processes of the embodiments of the present invention or steps thereof. Such a program may be executed by the CPU 3012 to cause the computer 3000 to perform certain operations associated with some or all of the blocks of flowcharts and block diagrams described herein.

The computer 3000 according to the present embodiment includes a CPU 3012, a RAM 3014, a graphic controller 3016, and a display device 3018, which are mutually connected by a host controller 3010. The computer 3000 also includes input/output units such as a communication interface 3022, a hard disk drive 3024, a DVD-ROM drive 3026 and an IC card drive, which are connected to the host controller 3010 via an input/output controller 3020. The computer also includes legacy input/output units such as a ROM 3030 and a keyboard 3042, which are connected to the input/output controller 3020 through an input/output chip 3040.

The CPU 3012 operates according to programs stored in the ROM 3030 and the RAM 3014, thereby controlling each unit. The graphic controller 3016 obtains image data generated by the CPU 3012 on a frame buffer or the like provided in the RAM 3014 or in itself, and causes the image data to be displayed on the display device 3018.

The communication interface 3022 communicates with other electronic devices via a network. The hard disk drive 3024 stores programs and data used by the CPU 3012 within the computer 3000. The DVD-ROM drive 3026 reads the programs or the data from the DVD-ROM 3001, and provides the hard disk drive 3024 with the programs or the data via the RAM 3014. The IC card drive reads the program and data from an IC card, and/or writes the program and data to the IC card.

The ROM 3030 stores therein a boot program or the like executed by the computer 3000 at the time of activation, and/or a program depending on the hardware of the computer 3000. The input/output chip 3040 may also connect various input/output units via a parallel port, a serial port, a keyboard port, a mouse port, and the like to the input/output controller 3020.

A program is provided by computer-readable storage medium such as the DVD-ROM 3001 or the IC card. The program is read from the computer-readable storage medium, installed into the hard disk drive 3024, RAM 3014, or ROM 3030, which are also examples of computer-readable storage medium, and executed by the CPU 3012. The information processing described in these programs is read into the computer 3000, resulting in cooperation between a program and the above-mentioned various types of hardware resources. An apparatus or method may be constituted by realizing the operation or processing of information in accordance with the usage of the computer 3000.

For example, when communication is performed between the computer 3000 and an external device, the CPU 3012 may execute a communication program loaded onto the RAM 3014 to instruct communication processing to the communication interface 3022, based on the processing described in the communication program. The communication interface 3022, under control of the CPU 3012, reads transmission data stored on a transmission buffering region provided in a recording medium such as the RAM 3014, the hard disk drive 3024, the DVD-ROM 3001, or the IC card, and transmits the read transmission data to a network or writes reception data received from a network to a reception buffering region or the like provided on the recording medium.

In addition, the CPU 3012 may cause all or a necessary portion of a file or a database to be read into the RAM 3014, the file or the database having been stored in an external recording medium such as the hard disk drive 3024, the DVD-ROM drive 3026 (DVD-ROM 3001), the IC card, and the like, and perform various types of processing on the data on the RAM 3014. The CPU 3012 may then write back the processed data to the external recording medium.

Various types of information such as various types of programs, data, tables, and databases may be stored in recording media and subjected to the information process. The CPU 3012 may perform various types of processing on the data read from the RAM 3014, which includes various types of operations, processing of information, condition judging, conditional branch, unconditional branch, search/replace of information, and the like, as described throughout this disclosure and designated by an instruction sequence of programs, and writes the result back to the RAM 3014. In addition, the CPU 3012 may search for information in a file, a database, and the like, in the recording medium. For example, when a plurality of entries, each having an attribute value of a first attribute associated with an attribute value of a second attribute, are stored in the recording medium, the CPU 3012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer-readable storage medium on or near the computer 3000. In addition, a recording medium such as a hard disk or a RAM provided in a server system connected to a dedicated communication network or the Internet can be used as the computer-readable storage medium, thereby providing the program to the computer 3000 via the network.

While the embodiments of the present invention have been described, the technical scope of the invention is not limited to the above described embodiments. It is apparent to persons skilled in the art that various alterations and improvements can be added to the above-described embodiments. Also, matters explained with reference to a particular embodiment can be applied to other embodiments as long as there is no technical contradiction. Also, each component may have similar features to another component having the same name and a different reference numeral. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 communication network, 20 user, 22 communication terminal, 100 vehicle management system, 120 vehicle, 122 vehicle control unit, 124 self-location estimation unit, 126 drive system, 128 electric power source system, 140 management server, 142 vehicle management unit, 144 payment settlement management unit, 222 communication control unit, 224 input and output control unit, 226 drive control unit, 228 electric power source control unit, 302 electric power generation system, 304 electric storage system, 306 electric power conversion unit, 308 system control unit, 310 fuel cell unit, 312 fuel supply unit, 314 oxidizing agent supply unit, 316 temperature control medium supply unit, 322 communication connector, 324 electric power connector, 326 electric power generation utility connector, 330 FC control unit, 340 electric power generation unit, 350 auxiliary machine battery, 422 restriction signal acquisition unit, 424 restriction information storage unit, 426 removal signal acquisition unit, 428 self-location acquisition unit, 432 use status determination unit, 434 communication status determination unit, 442 restriction decision unit, 444 output control unit, 522 vehicle location management unit, 524 vehicle abnormality detection unit, 532 arrear information acquisition unit, 534 payment information acquisition unit, 540 use restriction unit, 542 restriction signal transmission unit, 544 removal signal transmission unit, 550 storage unit, 552 vehicle information storage unit, 554 area information storage unit, 600 data table, 622 vehicle ID, 624 time, 626 vehicle location, 628 situation, 630 situation, 632 payment status, 634 restriction status, 3000 computer, 3001 DVD-ROM, 3010 host controller, 3012 CPU, 3014 RAM, 3016 graphic controller, 3018 display device, 3020 input/output controller, 3022 communication interface, 3024 hard disk drive, 3026 DVD-ROM drive, 3030 ROM, 3040 input/output chip, 3042 keyboard

What is claimed is:

1. A control apparatus that controls an electric power supply apparatus configured to supply electric power to a working machine having an activation switch or an ignition key,
the electric power supply apparatus including a fuel cell,
the control apparatus comprising:
a restriction request acquisition unit configured to acquire a restriction request for requesting restriction of the supply of the electric power from the electric power supply apparatus to the working machine via a communication network;
a restriction unit configured to restrict the supply of the electric power from the electric power supply apparatus to the working machine in a case where the restriction request acquisition unit acquires the restriction request; and
an end detection unit configured to detect end of the working machine according to an operation of the activation switch or the ignition key,
wherein:
the working machine is transport equipment;
the electric power supply apparatus is mounted to the working machine;
the restriction unit is configured to restrict the supply of the electric power by at least one of (i) a unit configured to set a supply amount of the electric power or an upper limit value of the supply amount to be lower than a predetermined value, (ii) a unit configured to prohibit activation of the fuel cell, (iii) a unit configured to set output electric power of the fuel cell or an upper limit value of the output electric power to be lower than a predetermined value, (iv) a unit configured to set an output rate of the fuel cell or an upper limit value of the output rate to be lower than a predetermined threshold, (v) a unit configured to prohibit replenishment of the fuel of the fuel cell, (vi) a unit configured to prohibit detachment of the fuel cell or detachment of a fuel cartridge of the fuel cell, and (vii) a unit configured to set a replenishable amount of the fuel of the fuel cell to be lower than a predetermined value, and
the restriction unit is configured to decide to start the restriction in a case where, after the restriction request acquisition unit acquires the restriction request, the end detection unit detects the end of the use of the working machine.

2. The control apparatus according to claim 1, further comprising:
a start detection unit configured to detect start of use of the working machine, wherein
the restriction unit is configured to decide the start of the restriction in a case where, after the restriction request acquisition unit acquires the restriction request and the end detection unit detects the end of the use of the working machine, the start detection unit detects the start of the use of the working machine.

3. The control apparatus according to claim 1, further comprising:
a removal request acquisition unit configured to acquire a removal request for requesting removal of the restriction via the communication network, wherein
the restriction unit is configured to decide the removal of the restriction in a case where the removal request acquisition unit acquires the removal request.

4. The control apparatus according to claim 1, further comprising:
a removal request acquisition unit configured to acquire a removal request for requesting removal of the restriction via the communication network, wherein
the restriction unit is configured to decide the removal of the restriction in a case where the removal request acquisition unit acquires the removal request.

5. The control apparatus according to claim 1, wherein the restriction unit is configured to select a method of restricting the supply of the electric power based on at least one of a current location, a duty status, and a communication status of the working machine, and a situation of a surrounding environment.

6. The control apparatus according to claim 1, wherein the restriction unit is configured to decide start or suspension of the restriction of the supply of the electric power based on at least one of a communication status of the working machine and a situation of a surrounding environment.

7. An electric power supply apparatus comprising:
the control apparatus according to claim 1; and
a fuel cell.

8. A working machine comprising:
the electric power supply apparatus according to claim 7; and
an electric motor configured to convert electrical energy supplied from the electric power supply apparatus into mechanical energy.

9. A management apparatus that manages an electric power supply apparatus, provided in a working machine, configured to supply electric power to the working machine,
the electric power supply apparatus including a fuel cell,
the management apparatus comprising:
an event detection unit configured to detect an occurrence of a predetermined first event related to at least one of the working machine and the electric power supply apparatus;
a restriction request transmission unit configured to transmit, in a case where the event detection unit detects the occurrence of the first event, a restriction request for requesting restriction of the supply of the electric power from the electric power supply apparatus to the working machine to at least one of the working machine and the electric power supply apparatus via a communication network; and
a location information acquisition unit configured to acquire location information indicating a location of at least one of the working machine and the electric power supply apparatus; and
a location determination unit configured to refer to an area information storage unit configured to store area information indicating a location of an area where the execution of the restriction is allowed, and determine whether a geographic relationship between (i) the location of at least one of the working machine and the electric power supply apparatus which is indicated by the location information and (ii) the location of the area indicated by the area information satisfies a predetermined first geographic condition, wherein:
the working machine is a transport equipment,
the restriction request transmission unit is configured to transmit the restriction request to at least one of the working machine and the electric power supply apparatus in a case where the geographic relationship satisfies the predetermined first geographic condition,
the restriction request includes information indicating a condition related to execution of the restriction; and
the information indicating the condition related to the execution of the restriction includes at least one of information indicating an area where the execution of the restriction is permitted, information indicating an area where the execution of the restriction is prohibited, information indicating an area where the execution of the restriction may be suspended, information indicating a period in which the execution of the restriction is permitted, information indicating a period in which the execution of the restriction is prohibited, information indicating a period in which the execution of the restriction may be suspended, information indicating a time slot in which the execution of the restriction is permitted, information indicating a time slot in which the execution of the restriction is prohibited, information indicating a time slot in which the execution of the restriction may be suspended, information indicating a communication status in which the execution of the restriction is permitted, information indicating a communication status in which the execution of the restriction is prohibited, and information indicating a communication status in which the execution of the restriction may be suspended.

10. The management apparatus according to claim 9, wherein the restriction request includes information indicating locations of the area where the execution of the restriction is allowed and the area where the execution of the restriction is prohibited.

11. The management apparatus according to claim 9, further comprising:
a location information acquisition unit configured to acquire location information indicating a location of at least one of the working machine and the electric power supply apparatus; and
an area extraction unit configured to refer to an area information storage unit configured to store area information indicating locations of an area where the execution of the restriction is allowed and the area where the execution of the restriction is prohibited, and extract an area where a geographic relationship between the area and the location of at least one of the working machine and the electric power supply apparatus satisfies a predetermined second geographic condition out of the area where the execution of the restriction is allowed and the area where the execution of the restriction is prohibited, wherein
the restriction request transmission unit is configured to transmit information indicating a location of the area extracted by the area extraction unit, together with the restriction request or in association with the restriction request, to at least one of the working machine and the electric power supply apparatus.

12. The management apparatus according to claim 9, wherein:
the event detection unit is configured to further detect at least one of an elimination of the first event and an occurrence of a second event that may eliminate the first event; and the management apparatus further comprises:
a removal request transmission unit configured to transmit, in a case where the event detection unit detects at least one of the elimination of the first event and the occurrence of the second event, a removal request for requesting removal of the restriction to at least one of the working machine and the electric power supply apparatus via the communication network.

13. The management apparatus according to claim 9, wherein the first event includes at least one of a failure, a theft, a loss, and an arrear of a usage fee of at least one of the working machine and the electric power supply apparatus.

14. A management system comprising:
the management apparatus according to claim 9.

15. A non-transitory computer-readable recording medium having recorded thereon a program that causes a computer to execute a control method of controlling an electric power supply apparatus configured to supply electric power to a working machine having an activation switch or an ignition key,
the electric power supply apparatus including a fuel cell, the control method comprising:
acquiring a restriction request for requesting restriction of the supply of the electric power from the electric power supply apparatus to the working machine via a communication network;
restricting the supply of the electric power from the electric power supply apparatus to the working machine in a case where the restriction request is acquired in the acquiring; and
detecting end of the working machine according to an operation of the activation switch or the ignition key, wherein:
the working machine is transport equipment;
the electric power supply apparatus is mounted to the working machine; and
the restricting includes restricting the supply of the electric power by at least one of (i) a unit configured to set a supply amount of the electric power or an upper limit value of the supply amount to be lower than a predetermined value, (ii) a unit configured to prohibit activation of the fuel cell, (iii) a unit configured to set output electric power of the fuel cell or an upper limit value of the output electric power to be lower than a predetermined value, (iv) a unit configured to set an output rate of the fuel cell or an upper limit value of the output rate to be lower than a predetermined threshold, (v) a unit configured to prohibit replenishment of the fuel of the fuel cell, (vi) a unit configured to prohibit detachment of the fuel cell or detachment of a fuel cartridge of the fuel cell, and (vii) a unit configured to set a replenishable amount of the fuel of the fuel cell to be lower than a predetermined value, and
the restricting includes deciding to start the restriction in a case where, after the restriction request is acquired, the end of the use of the working machine is detected.

16. A non-transitory computer-readable recording medium having recorded thereon a program that causes a computer to execute a management method of managing an electric power supply apparatus configured to supply electric power to a working machine,
the electric power supply apparatus including a fuel cell, the management method comprising:
detecting an occurrence of a predetermined first event related to at least one of the working machine and the electric power supply apparatus; and transmitting, in a case where the occurrence of the first event is detected in the detecting, a restriction request for requesting restriction of the supply of the electric power from the electric power supply apparatus to the working machine to at least one of the working machine and the electric power supply apparatus via a communication network, wherein:

the first event is a theft or a loss of at least one of the working machine and the electric power supply apparatus;

the restriction request includes information indicating a condition related to execution of the restriction; and the information indicating the condition related to the execution of the restriction includes at least one of information indicating an area where the execution of the restriction is permitted, information indicating an area where the execution of the restriction is prohibited, information indicating an area where the execution of the restriction may be suspended, information indicating a period in which the execution of the restriction is permitted, information indicating a period in which the execution of the restriction is prohibited, information indicating a period in which the execution of the restriction may be suspended, information indicating a time slot in which the execution of the restriction is permitted, information indicating a time slot in which the execution of the restriction is prohibited, information indicating a time slot in which the execution of the restriction may be suspended, information indicating a communication status in which the execution of the restriction is permitted, information indicating a communication status in which the execution of the restriction is prohibited, and information indicating a communication status in which the execution of the restriction may be suspended.

17. A control method of controlling an electric power supply apparatus configured to supply electric power to a working machine having an activation switch or an ignition key, the electric power supply apparatus including a fuel cell, the control method comprising:

acquiring a restriction request for requesting restriction of the supply of the electric power from the electric power supply apparatus to the working machine via a communication network;

restricting the supply of the electric power from the electric power supply apparatus to the working machine in a case where the restriction request is acquired in the acquiring; and detecting end of the working machine according to an operation of the activation switch or the ignition key, wherein:

the working machine is transport equipment;

the electric power supply apparatus is mounted to the working machine; and the restricting includes restricting the supply of the electric power by at least one of (i) a unit configured to set a supply amount of the electric power or an upper limit value of the supply amount to be lower than a predetermined value, (ii) a unit configured to prohibit activation of the fuel cell, (iii) a unit configured to set output electric power of the fuel cell or an upper limit value of the output electric power to be lower than a predetermined value, (iv) a unit configured to set an output rate of the fuel cell or an upper limit value of the output rate to be lower than a predetermined threshold, (v) a unit configured to prohibit replenishment of the fuel of the fuel cell, (vi) a unit configured to prohibit detachment of the fuel cell or detachment of a fuel cartridge of the fuel cell, and (vii) a unit configured to set a replenishable amount of the fuel of the fuel cell to be lower than a predetermined value, and the restricting includes deciding to start the restriction in a case where, after the restriction request is acquired, the end of the use of the working machine is detected.

18. A management method of managing an electric power supply apparatus configured to supply electric power to a working machine, the electric power supply apparatus including a fuel cell, the management method comprising:

detecting an occurrence of a predetermined first event related to at least one of the working machine and the electric power supply apparatus; and transmitting, in a case where the occurrence of the first event is detected in the detecting, a restriction request for requesting restriction of the supply of the electric power from the electric power supply apparatus to the working machine to at least one of the working machine and the electric power supply apparatus via a communication network, wherein:

the first event is a theft or a loss of at least one of the working machine and the electric power supply apparatus;

the restriction request includes information indicating a condition related to execution of the restriction; and the information indicating the condition related to the execution of the restriction includes at least one of information indicating an area where the execution of the restriction is permitted, information indicating an area where the execution of the restriction is prohibited, information indicating an area where the execution of the restriction may be suspended, information indicating a period in which the execution of the restriction is permitted, information indicating a period in which the execution of the restriction is prohibited, information indicating a period in which the execution of the restriction may be suspended, information indicating a time slot in which the execution of the restriction is permitted, information indicating a time slot in which the execution of the restriction is prohibited, information indicating a time slot in which the execution of the restriction may be suspended, information indicating a communication status in which the execution of the restriction is permitted, information indicating a communication status in which the execution of the restriction is prohibited, and information indicating a communication status in which the execution of the restriction may be suspended.

* * * * *